United States Patent
Kent et al.

(10) Patent No.: US 7,590,566 B2
(45) Date of Patent: Sep. 15, 2009

(54) METHOD AND SYSTEM FOR MANUFACTURING AND RETAILING PRODUCTS PROVIDED BY REMOTE VENDORS TO REMOTE CUSTOMERS

(75) Inventors: Paul R. Kent, Edmonds, WA (US); Mark J. Trumper, Edmonds, WA (US); Jennifer Watson, Avon, CT (US); Eric N. Tully, Canton, CT (US)

(73) Assignee: Maverick Multimedia, Inc., Edmonds, WA (US)

( * ) Notice: Subject to any disclaimer, the term of this patent is extended or adjusted under 35 U.S.C. 154(b) by 602 days.

(21) Appl. No.: 11/206,653

(22) Filed: Aug. 18, 2005

(65) Prior Publication Data

US 2007/0043579 A1 Feb. 22, 2007

(51) Int. Cl.
*G06Q 30/00* (2006.01)
(52) U.S. Cl. .................. 705/26; 705/1; 705/27; 705/400; 707/1; 707/10; 707/104.1; 235/10; 718/106; 719/315
(58) Field of Classification Search ............... 705/1, 705/26, 400, 27; 707/10, 1, 104.1; 709/206; 235/10; 718/106; 719/315
See application file for complete search history.

(56) References Cited

U.S. PATENT DOCUMENTS

| | | | |
|---|---|---|---|
| 6,895,401 B2 * | 5/2005 | Skinner et al. ............... 707/1 |
| 7,228,547 B2 * | 6/2007 | Yaung ....................... 718/106 |
| 2002/0199033 A1 * | 12/2002 | Krivoruchko ............... 709/315 |
| 2003/0061217 A1 * | 3/2003 | Whittingham et al. ........ 707/10 |
| 2005/0154765 A1 * | 7/2005 | Seitz et al. ............... 707/104.1 |
| 2006/0015467 A1 * | 1/2006 | Morken et al. .............. 705/400 |
| 2007/0084919 A1 * | 4/2007 | Petrovich .................... 235/383 |

* cited by examiner

*Primary Examiner*—Yogesh C Garg
(74) *Attorney, Agent, or Firm*—Olympic Patent Works PLLC

(57) ABSTRACT

Embodiments of the present invention include flexible and dynamic manufacturing and retailing systems that employ instantiated quoter objects for communicating with remote vendor interfaces to obtain information from vendors related to quote solicitations and to receive and process orders received from remote customers. The quoter objects may also access one or more database systems associated with the retailing system for locally storing and retrieving vendor and product information within the retailing system. The quoter objects may be implemented by vendors, transmitted by vendors to a retailing system, and automatically, manually, or semi-automatically incorporated within the retailing system. In certain embodiments of the retailing system, quoter objects are instantiated by decision support systems that conduct interactive dialogs with clients through one or more customer interfaces via one or more different types of communications media.

30 Claims, 29 Drawing Sheets

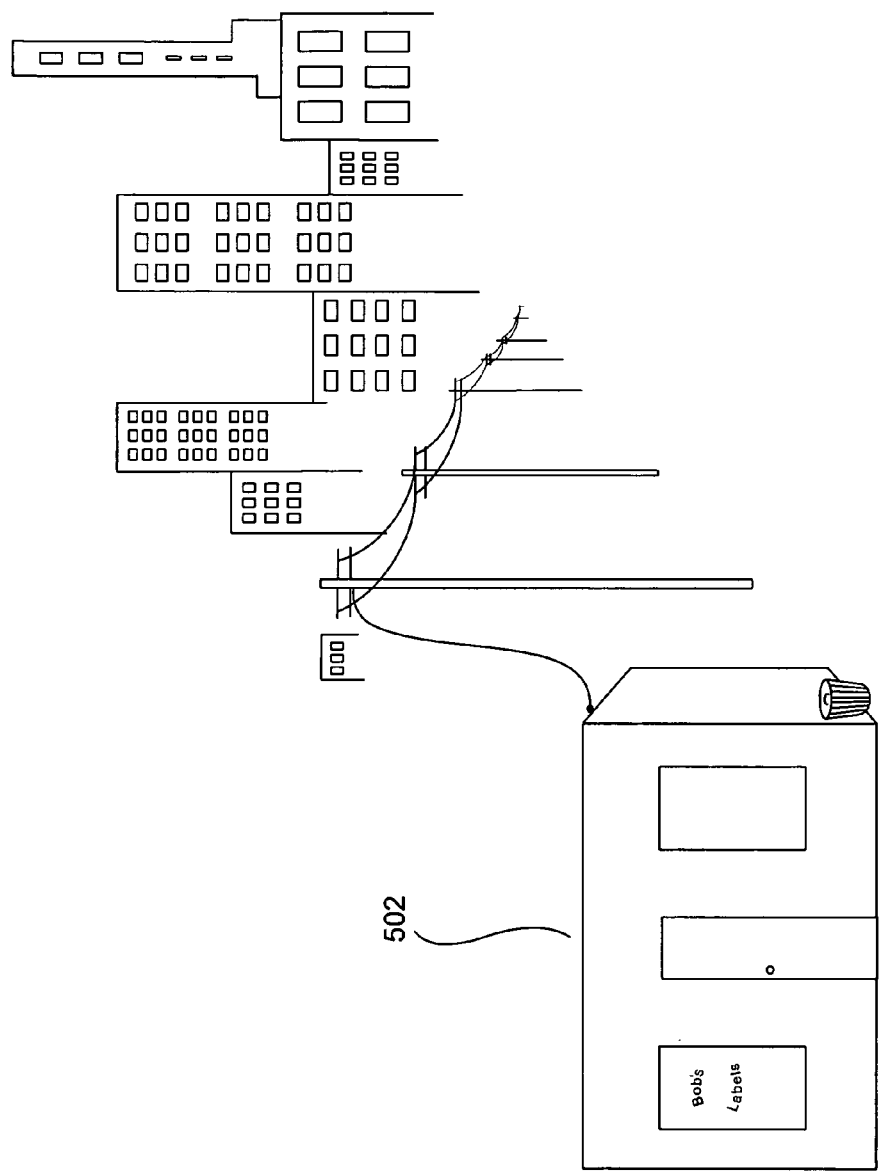
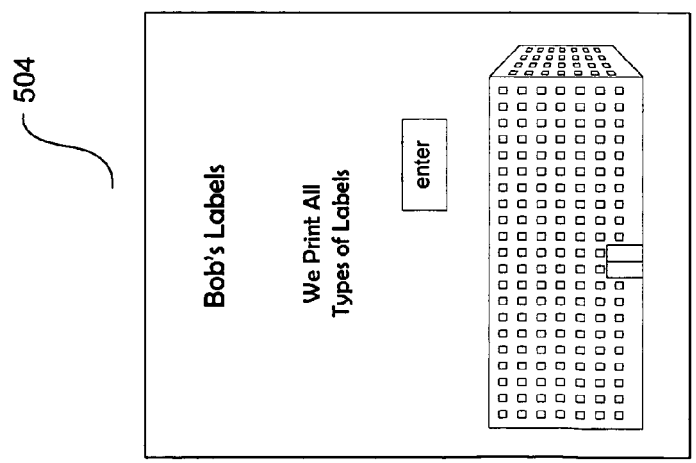
*Figure 5*

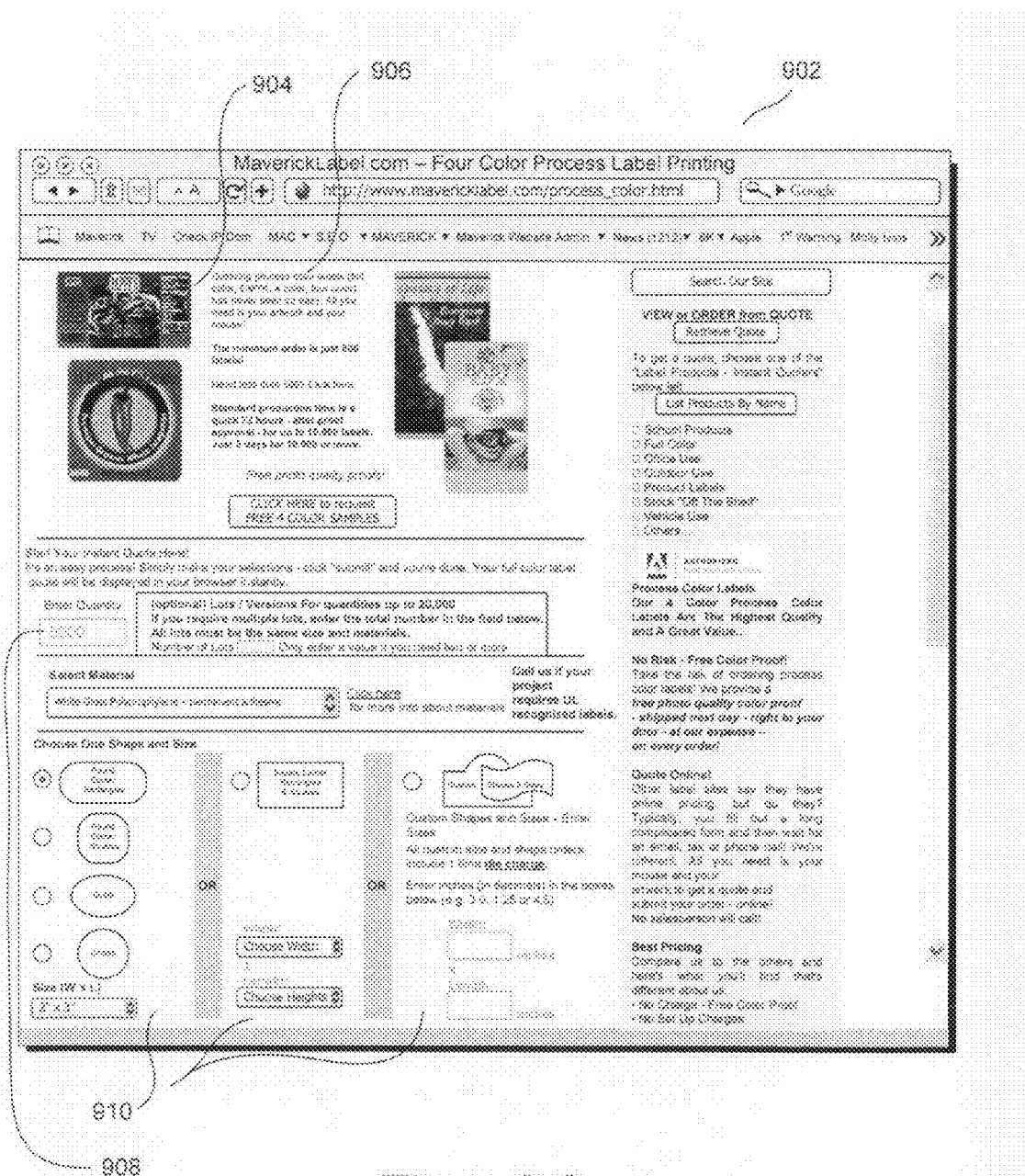
Figure 9.1

| | | 1102 | 1103 | 1104 |

Product [Process Color Labels]

| Quantity | Ross Printing Company Cost/Price | Northwest Flexo Cost/Price | Discount Labels Cost/Price |
|---|---|---|---|
| 5,000 | $896.52 / $1,434.43 | $525.30 / $866.74 | $525.30 / $866.74 |

| | |
|---|---|
| Quantity | 5000 |
| Number of Lots | |
| Material | White Gloss Polypropylene – permanent adhesive |
| Shape | ◉ Rectangle<br>○ Square<br>○ Oval<br>○ Circle<br>○ Butt-cut Rectangle<br>○ Custom Shape |
| Size | 2" x 3" |
| Width | 1/2" |
| Height | 1/2" |
| Width | |
| Height | |
| Barcode or Numbering | None |
| Coating | ○<br>◉ Hi-Gloss Laminate<br>○ Matte Laminate<br>○ Hi-Gloss UV Varnish<br>○ Matte UV Varnish |
| Roll Unwind Direction | ◉ #1<br>○ #2<br>○ #3<br>○ #4<br>○ #5<br>○ #6<br>○ #7<br>○ #8 |
| Core Size | ◉ 1"<br>○ 3" |
| How Are Labels Applied | ◉ Applied By Hand<br>○ Applied By Machine |
| Custom Color | |
| Foil | |
| Proof Options | Paper Proof |

[Compare Quotes]

*Figure 11*

| Product | Process Color Labels | |
|---|---|---|
| Quantity | Ross Printing Company Cost/Price — 1302 | Discount Labels Cost/Price — 1304 |
| 1,000 | $339.24 / $593.67 | $304.24 / $502.00 |

| | |
|---|---|
| Quantity | 1,000 |
| Number of Lots | |
| Material | White Gloss Polypropylene – permanent adhesive |
| Shape | ● Rectangle<br>○ Square<br>○ Oval<br>○ Circle<br>○ Butt-cut Rectangle<br>○ Custom Shape |
| Size | 2" x 3" |
| Width | 1/2" |
| Height | 1/2" |
| Width | |
| Height | |
| Barcode or Numbering | None |
| Coating | ○<br>● Hi-Gloss Laminate<br>○ Matte Laminate<br>○ Hi-Gloss UV Varnish<br>○ Matte UV Varnish |
| Roll Unwind Direction | ● #1<br>○ #2<br>○ #3<br>○ #4<br>○ #5<br>○ #6<br>○ #7<br>○ #8 |
| Core Size | ● 1"<br>○ 3" |
| How Are Labels Applied | ● Applied By Hand<br>○ Applied By Machine |
| Custom Color | |
| Foil | |
| Proof Options | Paper Proof |

Compare Quotes

| Product | Process Color Labels | |
|---|---|---|
| Quantity | | Ross Printing Company Cost/Price |
| 500 | | $247.62 / $433.34 |

Quantity          500
Number of Lots    
Material          White Gloss Polypropylene – permanent adhesive
Shape             ⦿ Rectangle
                  ○ Square
                  ○ Oval
                  ○ Circle
                  ○ Butt-cut Rectangle
                  ○ Custom Shape
Size              2" x 3"
Width             1/2"
Height            1/2"
Width             
Height            
Barcode or Numbering   None
Coating           ○
                  ⦿ Hi-Gloss Laminate
                  ○ Matte Laminate
                  ○ Hi-Gloss UV Varnish
                  ○ Matte UV Varnish
Roll Unwind Direction   ⦿ #1
                  ○ #2
                  ○ #3
                  ○ #4
                  ○ #5
                  ○ #6
                  ○ #7
                  ○ #8
Core Size         ○ 1"
                  ⦿ 3"
How Are Labels Applied   ⦿ Applied By Hand
                  ○ Applied By Machine
Custom Color Foil              
Proof Options     Paper Proof
                  [ Compare Quotes ]

*Figure 15*

| Quantity | Ross Printing Company Cost/Price | Discount Labels Cost/Price |
|---|---|---|
| 5,000 | $912.65 / $1,460.24 | $962.96 / $1,577.16 |

Product: Process Color Labels

- Quantity: 5000
- Number of Lots: 
- Material: White Gloss Polypropylene – permanent adhesive
- Shape:
  - ○ Rectangle
  - ○ Square
  - ○ Oval
  - ○ Circle
  - ○ Butt-cut Rectangle
  - ◉ Custom Shape
- Size: ½" x 1 ¼"
- Width: 1/2"
- Height: 1/2"
- Width: 2.38
- Height: 3.24
- Barcode or Numbering: None
- Coating:
  - ○
  - ◉ Hi-Gloss Laminate
  - ○ Matte Laminate
  - ○ Hi-Gloss UV Varnish
  - ○ Matte UV Varnish
- Roll Unwind Direction:
  - ◉ #1
  - ○ #2
  - ○ #3
  - ○ #4
  - ○ #5
  - ○ #6
  - ○ #7
  - ○ #8
- Core Size:
  - ○ 1"
  - ◉ 3"
- How Are Labels Applied:
  - ◉ Applied By Hand
  - ○ Applied By Machine
- Custom Color:
- Foil:
- Proof Options: Paper Proof

[ Compare Quotes ]

| internal member functions | |
|---|---|
| { low level OS/communications routines | ── 2002 |
| { database access routines | ── 2004 |
| display_interface ( ) | ── 2006 |
| update_interface (page, feature, value) | ── 2008 |
| receive_parameter (&page, &feature, &value) | ── 2010 |
| bool compute_productVendor (&product, &vendor, attributes[ ]) | ── 2012 |
| quoter* instantiate_quoter (product, vendor) | ── 2014 |
| obtain_quote (quoter, attributes [ ]) | ── 2016 |
| place_order (quoter, attributes [ ]) | ── 2018 |
| dialogue ( ) | ── 2020 |
| public member functions | |
| constructor (com,int(*report) (statusReport)) | ── 2022 |
| status (&statusReport) | ── 2026 |
| destructor( ) | ── 2024 |

*Figure 20*

| | |
|---|---|
| internal member functions | |
| { low level OS/communications routines | ~ 2302 |
| { database access routines | ~ 2304 |
| { vendor specific communications/dialogue | ~ 2306 |
| public member functions | |
| bool   validate (attributes[ ], &qNo) | ~ 2308 |
| quote (qNo, &vendorCost, &customerCost) | ~ 2310 |
| int   weight (qNo) | ~ 2312 |
| date   productionDate (qNo) | ~ 2314 |
| date   productionTime (qNo) | ~ 2316 |
| date   shipDate (qNo) | ~ 2318 |
| bool   placeOrder(qNo, customer info) | ~ 2320 |
| constructor( ) | ~ 2322 |
| destructor( ) | ~ 2324 |

*Figure 23*

METHOD AND SYSTEM FOR MANUFACTURING AND RETAILING PRODUCTS PROVIDED BY REMOTE VENDORS TO REMOTE CUSTOMERS

TECHNICAL FIELD

Embodiments of the present invention are related to manufacturing and retailing systems and, in particular, to methods and a manufacturing and/or retailing system for providing a uniform retail interface to remote customers for designing, ordering, and receiving products from multiple remote vendors.

BACKGROUND OF THE INVENTION

During the past fifteen years, Internet-based retailing has evolved from an infrequently used curiosity to an enormous, international marketplace. Internet-based retailing interfaces and virtual storefronts now provide secure, interactive shopping facilities to home customers, small business customers, and large-scale organizations and businesses. As the variety of products retailed through Internet-based retailing interfaces has grown, and as security requirements have increased, Internet-based retailing interfaces have correspondingly grown more complex and sophisticated. However, despite the enormous amount of time and resources expended by Internet-based retailers to develop and refine Internet-based retailing interfaces, a number of deficiencies remain. Embodiments of the current invention are related to retailing systems that provide a virtual or hybrid retailing interface between remote customers, interconnected with the retailing system through various communications interfaces, and multiple, remote vendors and manufacturers of particular products and product categories. Embodiments of the present invention are discussed, below, within the context of retailing printed labels, but may be used in developing and maintaining virtual and hybrid retailing interfaces for retailing a variety of different products and services provided by different types of vendors to a variety of different types of customers and users.

Printed labels have myriad different uses in modern societies, from political advertising and personal opinion display, including bumper stickers and various types of placards and advertising, to informational labels used for display and merchandizing of products, for display of instructions and directions for use of products, for display of warnings, and for many other uses. FIG. 1 shows an exemplary printed label. The printed label 100 features printed textural information 102 that may be printed in various different font sizes, colors, and styles on various different types of backgrounds. Printed labels may additionally include graphics, images, textured features, such as Braille lettering for visually impaired people, and other such non-textural information. Printed labels normally comprise a substrate, such as paper, various types of polymer films, metal foils, and other such materials, and may additionally comprise one or more additional layers, including clear, plastic weather-resilient finishes, backing layers, adhesives, and removable, non-stick backings to protect the adhesive until the printed label is used. Printed labels may feature reflective substrates, finishes, or coatings, various non-standard shapes and cutouts, and other features and characteristics by which printed labels may be customized for particular uses. Certain printed labels may conform to various standards and requirements, such as Underwriters Laboratories Recognition or CE Certification, and labels used for direct application to food products, cosmetics and drugs, or to windshields of motor vehicles. Although printed labels are a familiar and seemingly simple means for information display, there are many different types of printed labels, each type of printed label configurable to display an enormous variety of different types of information, and there are correspondingly many different parameters associated with printed labels used to describe or specify each different printed label.

FIG. 2 illustrates an exemplary menu-based interface that may be used to collect a sufficient number of parameters to characterize a particular printed label through a printed-label-ordering interface. A top-level menu 202 displays ten different parameter categories. Selection of any of the top-level parameter categories results in display of one or more additional menus related to the top-level parameter category. For example, when the top-level category "material" 204 is selected, a second level material menu 206 is displayed to allow for specification of a general type of material desired for a particular printed label. The second level menu 206 displays three different categories of application: (1) outdoor applications; (2) indoor applications; and (3) special applications, each application associated with potential materials that can be used in the application. Special applications may include particular application environments requiring special label materials, such as information labels used within fume hoods designed to contain caustic and reactive chemical substances, or labels placed on surfaces routinely exposed to petroleum products. When the category "outdoor application" 208 is selected from the second level menu 206, a third level menu is displayed 210 to allow a customer to select features of the printed label, the features applicable to printed labels used in the general application selected in the second level menu 206. For example, selection of the third level category "finish" 212 results in display of a fourth-level menu 214 from which a particular type of finish for the label can be selected, appropriate for the application selected from the second level menu. As another example, selection of the third level category "composition" 213 results in display of a fourth-level menu 216 from which a customer can select the type of substrate for the label. Additional top-level parameter categories include: type, color, graphics, size, shape, shipping address, a "needed by" category, quantity, and many various different standards or requirements for the label. FIG. 2 also shows second-level menus 218 and 220 displayed as a result of selection of the top-level-menu categories "needed by" 222 and "standard/requirements" 224, respectively.

FIG. 2 shows one hypothetical, printed-level-specification system that may be used in an Internet-based printed-label virtual store. However, there are an essentially limitless number of different printed-label specification interfaces and systems that may be created in order to allow customers to specify printed labels. For example, many different, alternative categories of parameters may be employed in differently, hierarchically organized sets of menus and forms. In other printed-label specification interfaces, fewer menus may be employed, and all relevant parameters and other input may be collected from a single displayed page or a few displayed pages. In certain systems, a particular printed label may be specified using an unformatted character string, which is then parsed by a printed-label-specification system to determine a type of printed label desired by a customer, with possible further dialog or other interaction with a customer employed to refine a specification. In other systems, a customer may be required to manually scan a catalog of printed-label types, and to choose a printed-label identifier from the catalog to specify the type of printed label desired. The interface or system employed for specifying printed labels may also depend on the types of printed labels sold by a particular printed-label vendor, or on the capabilities and technologies of a particular vendor. In general, the problem of retailing printed labels is more complex than that of retailing already designed and mass produced products and standard services, because printed-labels are generally designed by the customer, prior to ordering by the customer, and each printed-label order is often unique for a specific customer. While it might seem desirable for printed-label vendors to establish and use a common, static, universal printed-label-specification interface and system, in order to standardize specification and description of printed labels, such an interface and system would be both impractical and undesirable due to the enormous number of different types of printed labels, the need for ad hoc design of printed labels by customers, and the ever-changing capabilities and technologies wielded by different printed-label vendors, and the need for vendors to differentiate themselves in various marketplaces. However, as discussed in subsequent sections, the problems associated with the large number of print-label vendor interfaces are particularly difficult for virtual or hybrid retailing systems. Retailers, retailing system designers, manufacturers, and vendors, and, ultimately, customers that use retailing systems have recognized the need for more efficient systems and methods for retailing printed-labels, and other products with complex specification and descriptions.

SUMMARY OF THE INVENTION

Embodiments of the present invention include flexible and dynamic manufacturing and retailing systems that employ instantiated quoter objects for communicating with remote vendor interfaces to obtain information from vendors related to quote solicitations and to receive and process orders received from remote customers. The quoter objects may also access one or more database systems associated with the retailing system for locally storing and retrieving vendor and product information within the retailing system. The quoter objects may be implemented by vendors, transmitted by vendors to a retailing system, and automatically, manually, or semi-automatically incorporated within the retailing system. In certain embodiments of the manufacturing and retailing systems, quoter objects are instantiated by decision support systems that conduct interactive dialogs with customers through one or more customer interfaces via one or more different types of communications media to allow customers to design and order products and services.

BRIEF DESCRIPTION OF THE DRAWINGS

FIGS. 5 and 6 illustrate a second business model for retailing printed labels.

FIGS. 9A-B show a simple, exemplary quote-solicitation form displayed by a browser on a user's computer.

FIG. 11 shows additional information, available to an administrative user of the described embodiment, underlying the quote shown in FIG. 10.

FIG. 13 shows additional information, available to an administrative user of the described embodiment, underlying the modified quote shown in FIG. 12.

FIG. 15 shows additional information, available to an administrative user of the described embodiment, underlying the modified quote shown in FIG. 14.

FIG. 17 shows additional information, available to an administrative user of the described embodiment, underlying the modified quote shown in FIG. 16.

FIG. 20 illustrates internal and public member functions that together comprise a DSS class definition in an exemplary embodiment of the present invention.

FIG. 23 illustrates the quoter interface presented by an instantiated quoter to a DSS.

DETAILED DESCRIPTION OF THE INVENTION

Embodiments of the present invention include flexible and dynamic retailing systems that interface remote clients with remote vendors. In certain cases, the retailing systems are hybrid systems, with products and services offered directly from the retailing system as well as from remote vendors through a uniform interface, while, in other cases, the retailing systems are virtual retailing systems, in which products and services are provided only by remote vendors through a uniform interface provided to remote customers by the retailing systems for design, pricing, and ordering of products and services.

Figure 1:
FIG. 1 shows an exemplary printed label.
Figure 2:
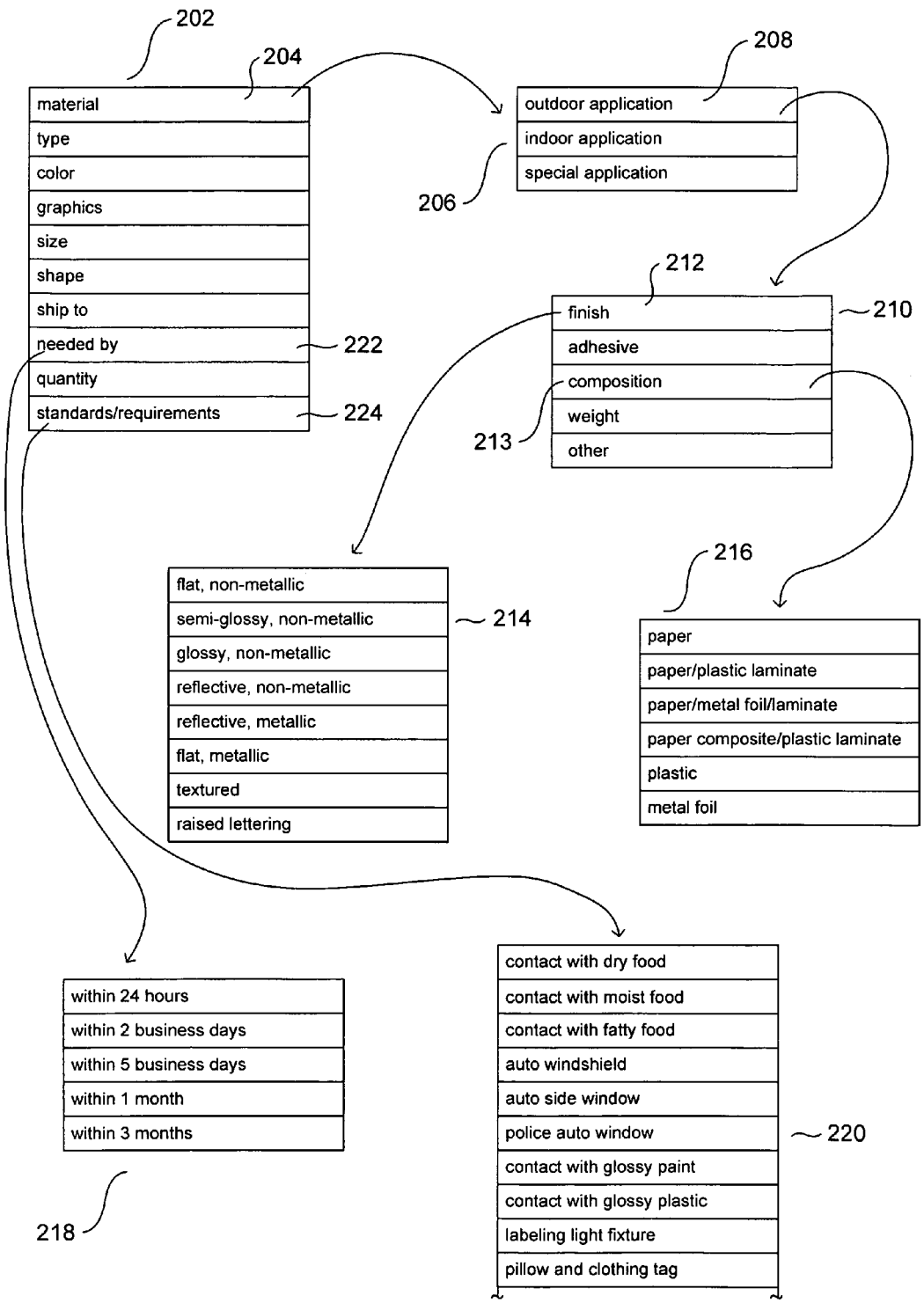
FIG. 2 illustrates an exemplary menu-based interface that may be used to collect a sufficient number of parameters to characterize a particular printed label through a printed-label-ordering interface.
Figure 3:
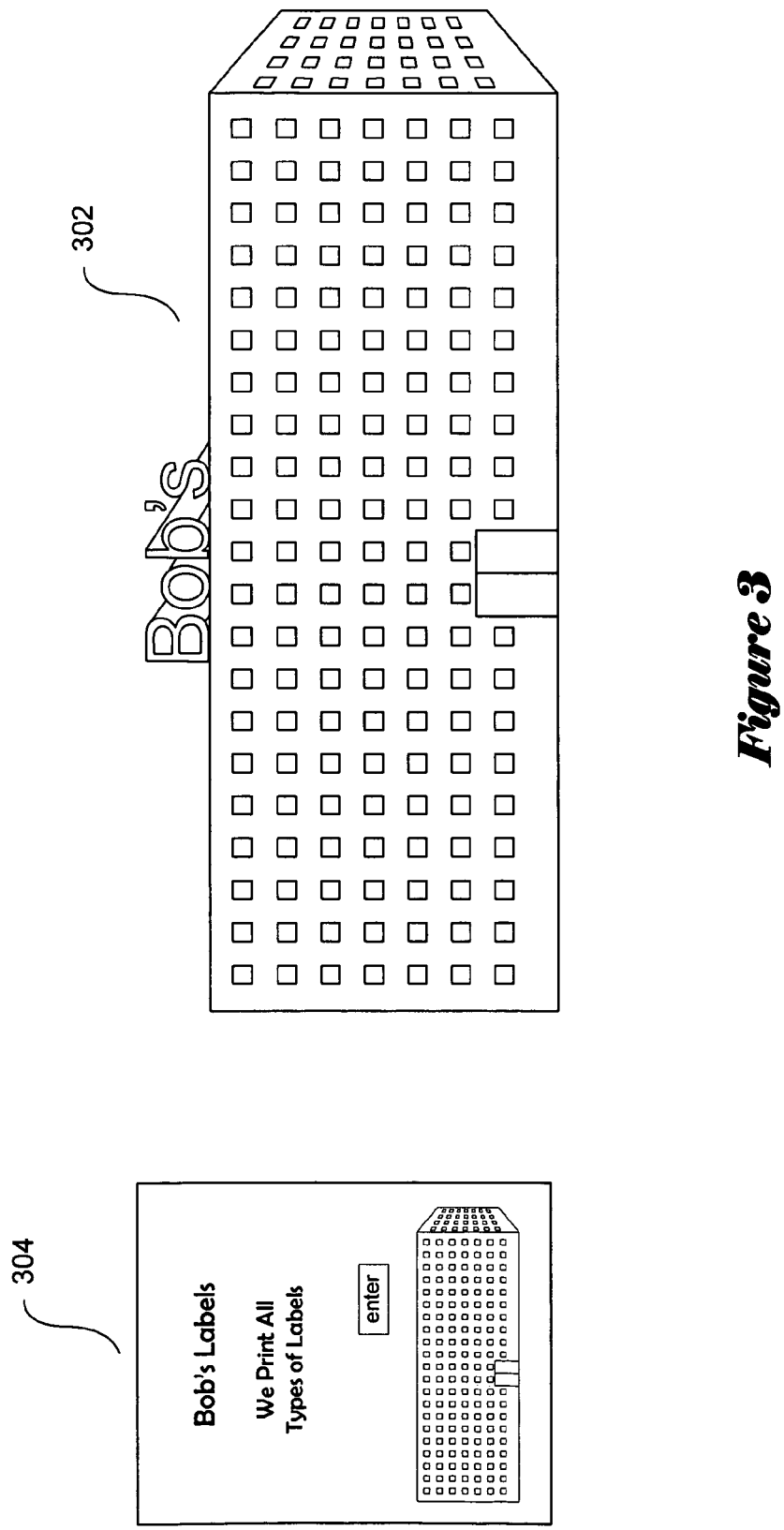
FIGS. 3 and 4 illustrate one possible business model for retailing printed labels.
Figure 4:
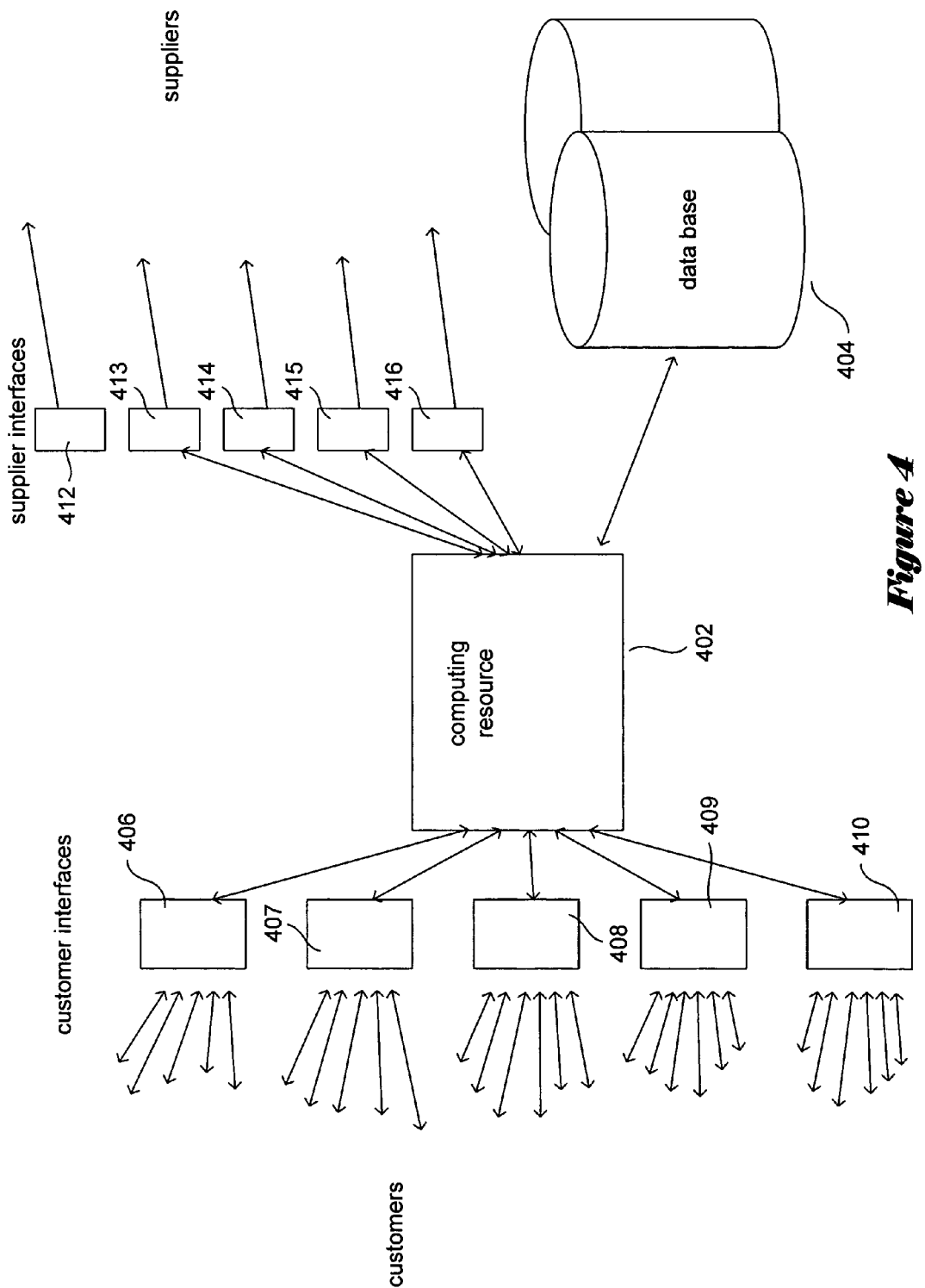

FIGS. 3 and 4 illustrate one possible business model for retailing printed labels. As shown in FIG. 3, a printed label manufacturer may maintain a large, printed-label-manufacturing facility 302 with a wide variety of printed-label manufacturing equipment and technologies for printing a wide variety of different types of printed labels. The printed label manufacturer may retail printed labels through many different channels, including through an Internet-based storefront, a first web page 304 of which is shown in FIG. 3.

FIG. 4 shows a high-level architecture for the computing and data-storage facilities employed by the printed-label manufacturer and retailer illustrated in FIG. 3. The printed label manufacturer and retailer may employ a large, centralized computing resource 402, such as a number of networked, mainframe computers, and an associated centralized database resource 404, including networked disk arrays and disk-array management facilities. The computing and database resources are employed to provide a number of different customer interfaces 406-410 through which remote customers can design, price, order, and pay for printed labels. The computing and database resources also support a number of supplier interfaces 412-416 through which the printed-label manufacturer and retailer can obtain the raw materials and supplies needed for manufacture of the printed labels. The different customer interfaces 406-410 may be used for receiving design specifications, quote solicitations, and orders, as well as for furnishing pricing and product information, through a variety of different communications media and communications-medium-related technologies. For example, one customer interface may be used for receiving design specifications and orders via fax communications, while another customer interface may comprise a web site that implements a web-based printed-label retail establishment. In addition, there may be separate customer interfaces for different categories of customers. For example, the printed-label manufacturer and retailer may support a first website for Internet-based retailing of printed labels to individuals and small businesses and a second website for retailing printed labels to large organizations, including governmental agencies and large corporations. Additional customer interfaces may provide product design and order-entry support for sales representatives communicating with customers by telephone or person-to-person, in printed-label retail outlets. The computing and database resources also generally support various internal facilities and applications, including administrative interfaces, process monitoring and allocation systems, order-tracking systems, and a variety of other information systems needed for controlling and managing the manufacturing and retail facilities.

Figure 6:
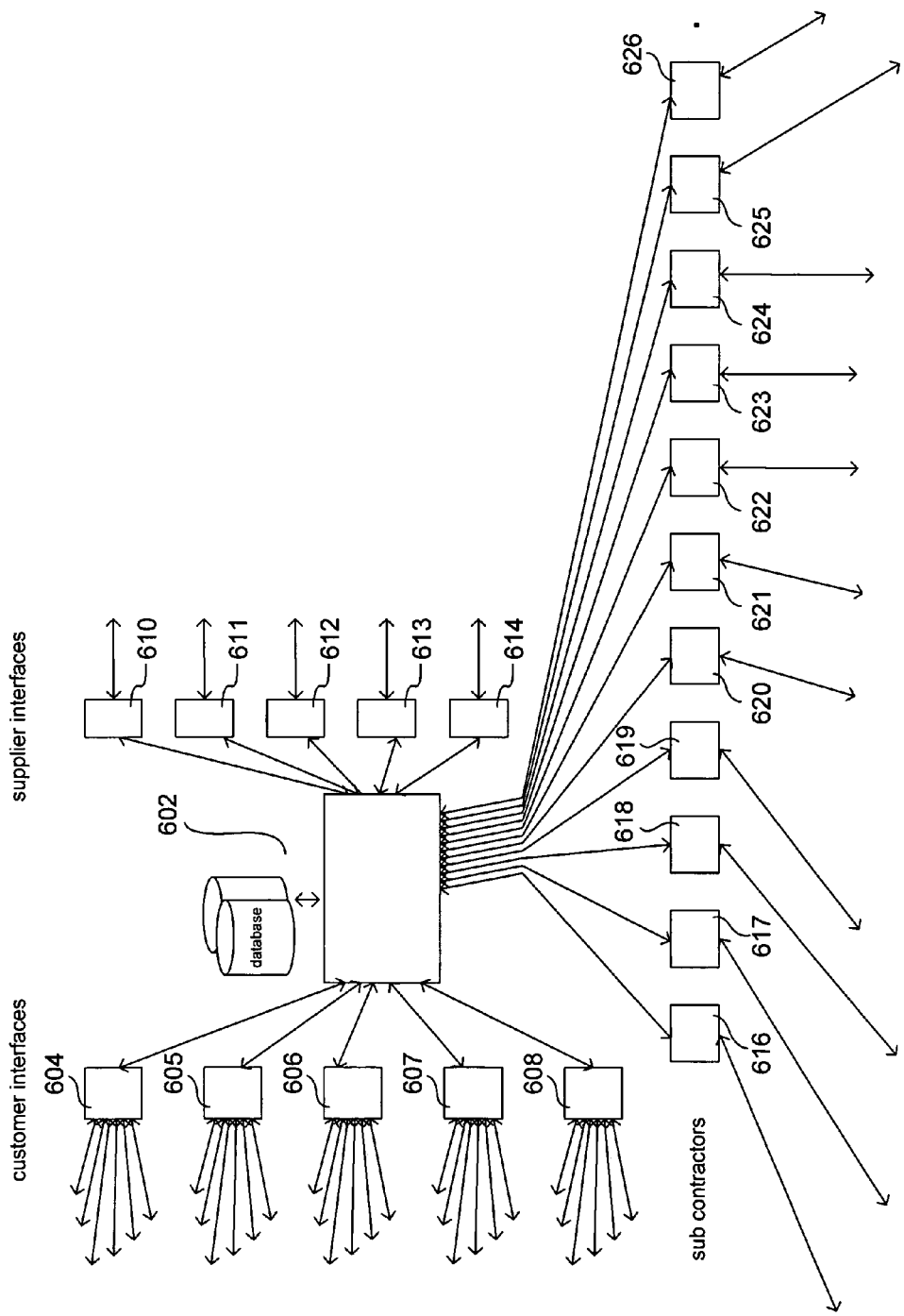

FIGS. 5 and 6 illustrate a second business model for retailing printed labels. In the second model, as shown in FIG. 5, the printed-label retailer maintains a small facility 502 to serve as a communications hub for a virtual printed-label retailing facility. The small facility 502 does not include any label manufacturing or printing facilities, but instead only a sufficient computing and database facility for maintaining a virtual printed-label retail store in order to supply printed labels to customers of the virtual printed-label retailing facility. Note that, as shown in FIG. 5, a printed-label retailer using the second business model, displayed in FIG. 5, may provide a virtual printed-label-retailing website 504 identical to that of a printed-label manufacturing and retail facility using the first business model, illustrated in FIG. 3. In other words, from a customer standpoint, the two business models appear the same. Both provide Internet-based retailing facilities through which the customer can order any of a large variety of different types of customized, printed labels. In the first business model, shown in FIG. 3, the printed-label retailer manufactures the printed-labels shipped to customers in response to orders placed through the Internet-based retailing facility, while a printed-label retailer using the second business model does not manufacture printed labels, but instead forwards customer design specifications and orders to printed-label-manufacturing vendors, or subcontractors, in order to fulfill customer orders, pricing the printed-labels above the price charged by the remote vendors in order to achieve a profit.

FIG. 6 shows a high-level architecture for the computing and data-storage facility employed by a printed-label retailer using the second business model, shown in FIG. 5. The computing and data-storage facility architecture for the second business model includes computing and database resources 602, customer interfaces 604-608, and supplier interfaces 610-614, as shown in the architecture for the first business model in FIG. 4, but, in addition, includes a large number of subcontractor, or vendor, interfaces 616-626 through which the printed-label retailer forwards customer design specifications, quote solicitations, and orders to appropriate printed-label manufacturers and retailers for fulfillment. Thus, while a printed-label retailer using the first business model has both significant overheads for automated retailing and for physical manufacturing of printed labels, a printed-label retailer using the second business model has no overhead for manufacturing printed labels, but a much larger overhead for automated retailing, product design, and order fulfillment. Many hybrid printed-label manufacturing and retailing business methods lie in a spectrum between the virtual retailing business model shown in FIG. 5 and the fully integrated business model shown in FIG. 3. For example, a printed-label retailer may choose to support limited printing and manufacturing facilities for a certain class or classes of printed labels, and employ subcontractors, or remote vendors, for additional categories of printed labels.

Figure 7:
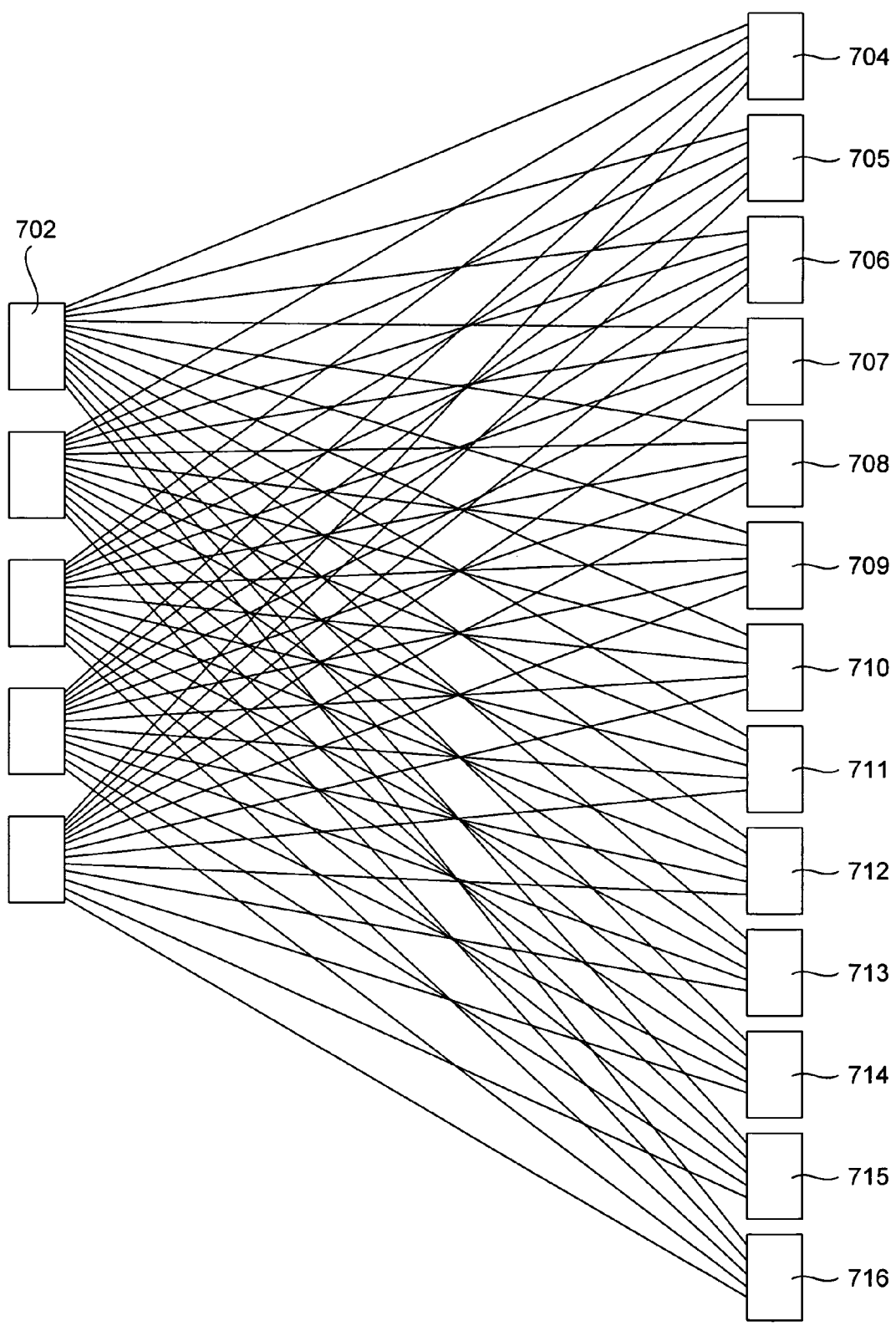
FIG. 7 illustrates the complexity of the software employed by a printed-label retailer using the second business model illustrated in FIG. 5.

The high-level architecture for the second business model, shown in FIG. 6, understates the complexity of the computing resources needed to manage interconnection between the various different customer interfaces 604-608 and the different subcontractor, or vendor, interfaces 616-626. In general, the complexity of the software needed to interconnect customer interfaces with subcontractors is proportional to the product of the number of customer interfaces and the number of subcontractors. FIG. 7 illustrates the complexity of the software employed by a printed-label retailer using the second business model illustrated in FIG. 5. Each customer interface, such as customer interface 702, needs to include separate, specialized routines for interfacing to each of the vendor, or subcontractor, interfaces 704-716. However, the level of complexity for automated interconnection of customers to subcontractors may be even more complex than indicated in FIG. 7.

Figure 8:
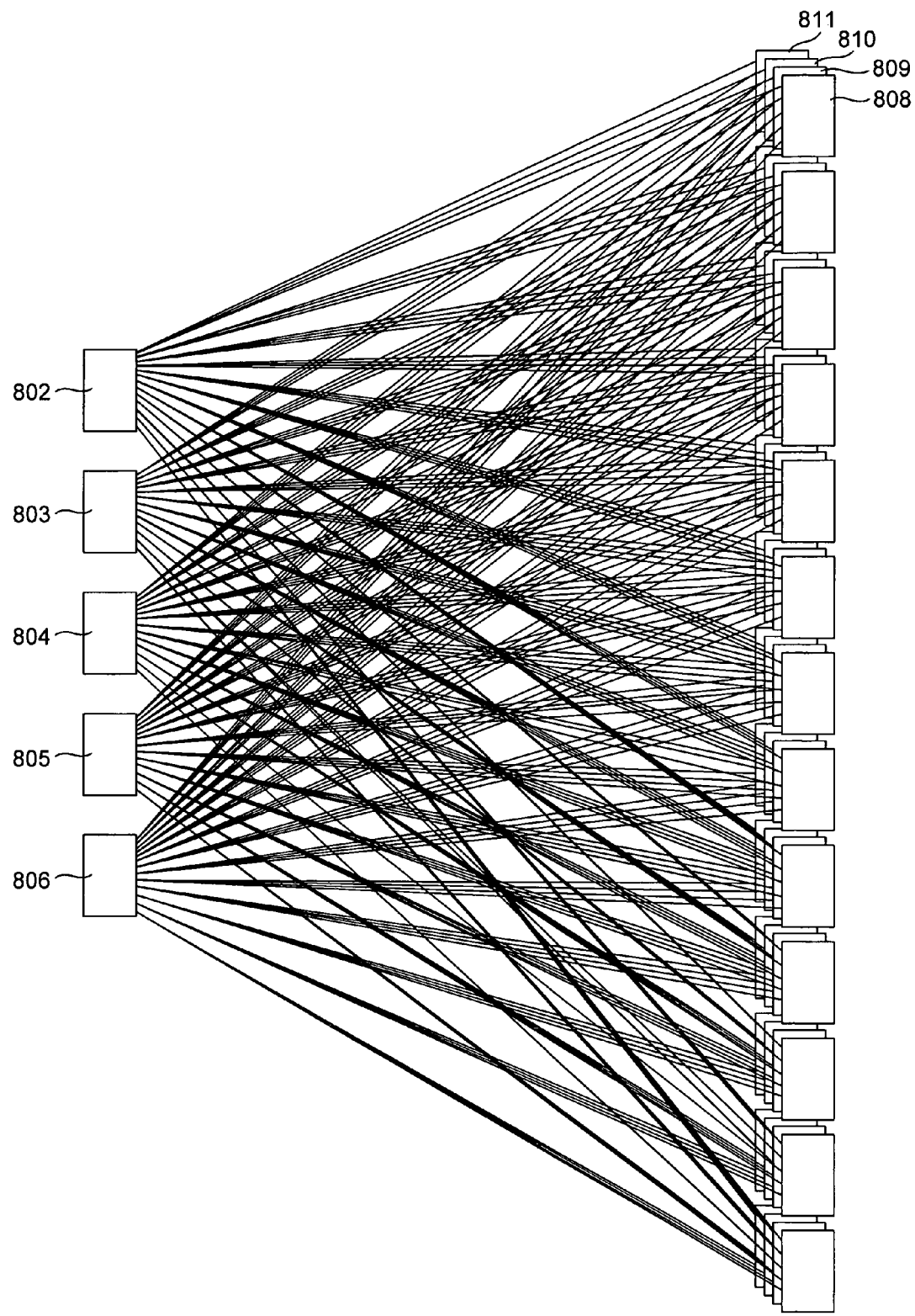
FIG. 8 illustrates the complexity inherent in interfacing customers to vendors in practical retail environments.

FIG. 8 illustrates the complexity inherent in interfacing customers to vendors in practical retail environments. Shown in FIG. 8, each of the customer interfaces 802-806 may need specialized routines for interfacing to each of the different vendor interfaces supported by each of the different printed-label vendors. For example, a first printed-label vendor may support four different interfaces 808-811. Thus, the complexity of an automated printed-label retailing system for a printed-label retailer following the second business model, illustrated in FIG. 5, may involve specialized routines for each customer-interface/vendor/vendor-interface triple, a number of specialized routines proportional to the product of the number of customer interfaces multiplied by the number of vendors, in turn multiplied by the numbers of interfaces supported by each of the various vendors. As the number of vendors employed by the virtual printed-label retailer grows, the complexity of the automated system employed by the virtual printed-label retailer grows multiplicatively, very quickly requiring a massive software engineering and information processing effort to construct and maintain interfaces between each of the customer interfaces supported by the virtual printed-label retailer and each of various different interfaces supported by each of the different printed-label vendors used to fulfill orders received by the virtual printed-label retailer. Moreover, as discussed further below, the vendor interfaces may be relatively dynamic, frequently changing to offer new products printed using newly acquired technologies, or to reflect current capacities for production. Thus, the complexity also includes a time dimension, adding yet further complexity to the problem, and necessitating that the virtual printed-label retailer continuously monitor vendor interfaces in order to track the current state of the remote vendor's offerings.

Next, an exemplary printed-label-ordering dialog between a customer and a virtual printed-label retailer through an Internet-based virtual store is discussed, with reference to FIGS. 9A-17. The exemplary dialog illustrated in FIGS. 9A-17, and discussed below, provides one simple example of a virtual printed-label retail facility that, in turn, represents one embodiment of the present invention. The computational underpinnings of this embodiment are subsequently discussed.

Figure 9B:
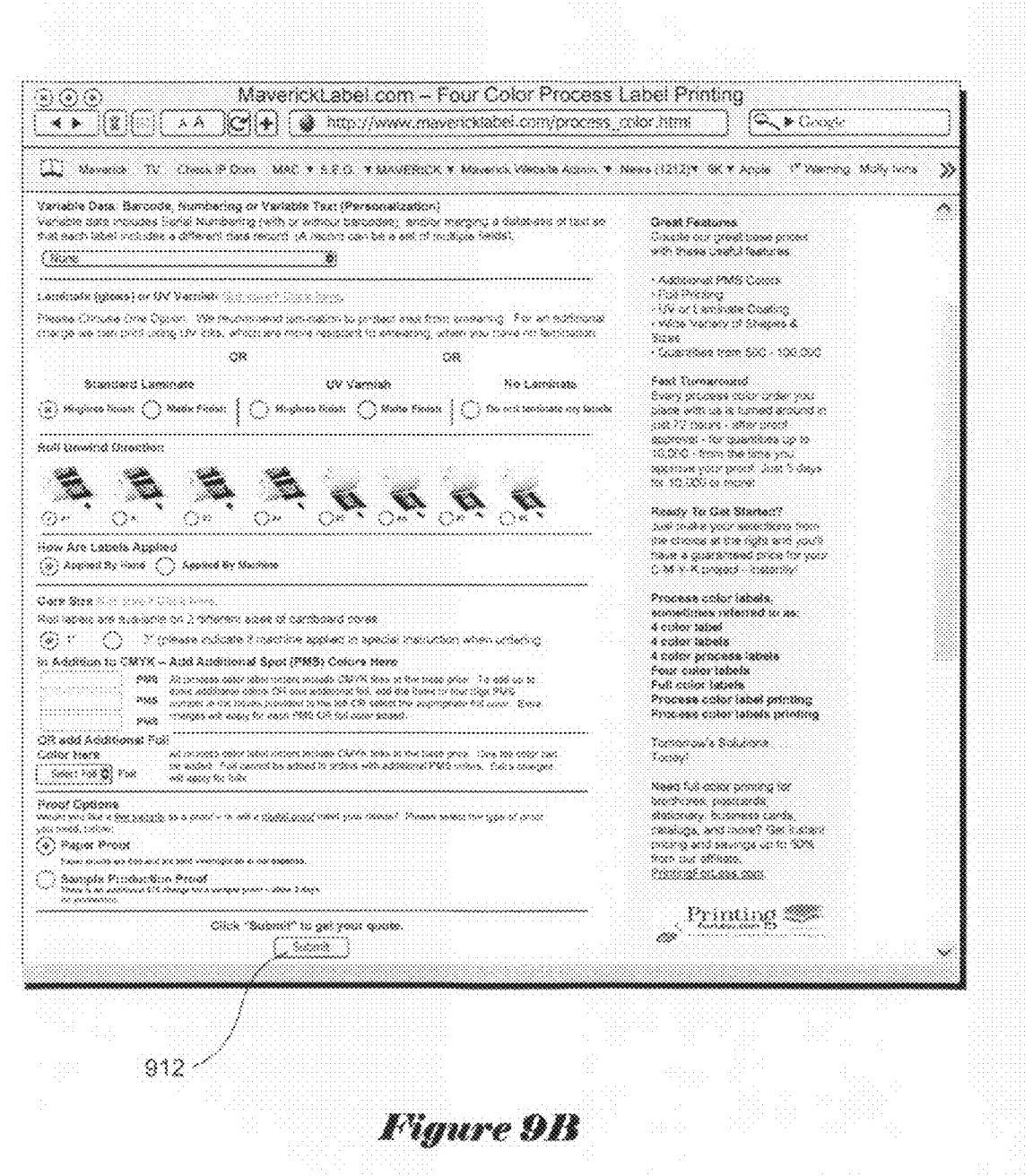

FIGS. 9A-B show a simple, exemplary quote-solicitation form displayed by a browser on a user's computer. In general, an initial dialog facilitated by display of a home page, and various additional pages, may lead to the display of the quote-solicitation form shown in FIGS. 9A-B. The initial dialog is not illustrated in the figures. The quote-solicitation form 902 has been constructed, by software implementing one of the customer interfaces (e.g. 604 in FIG. 6) within the virtual printed-label retailer's computing and database system. The quote-solicitation form shows a graphical representation 904 and textual description 906 of the process color labels that a customer can receive quotes for, and order, using the quote-solicitation form shown in FIGS. 9A-B. The quote-solicitation form includes various data-entry fields, such as an input field 908 for entering the quantity of a particular label desired by a customer, radio buttons and data-entry fields for specifying the shape and size of the desired printed label 910, and additional fields for specifying a design for the desired label, as well as for selecting various options for receiving the quote.

Figure 10:
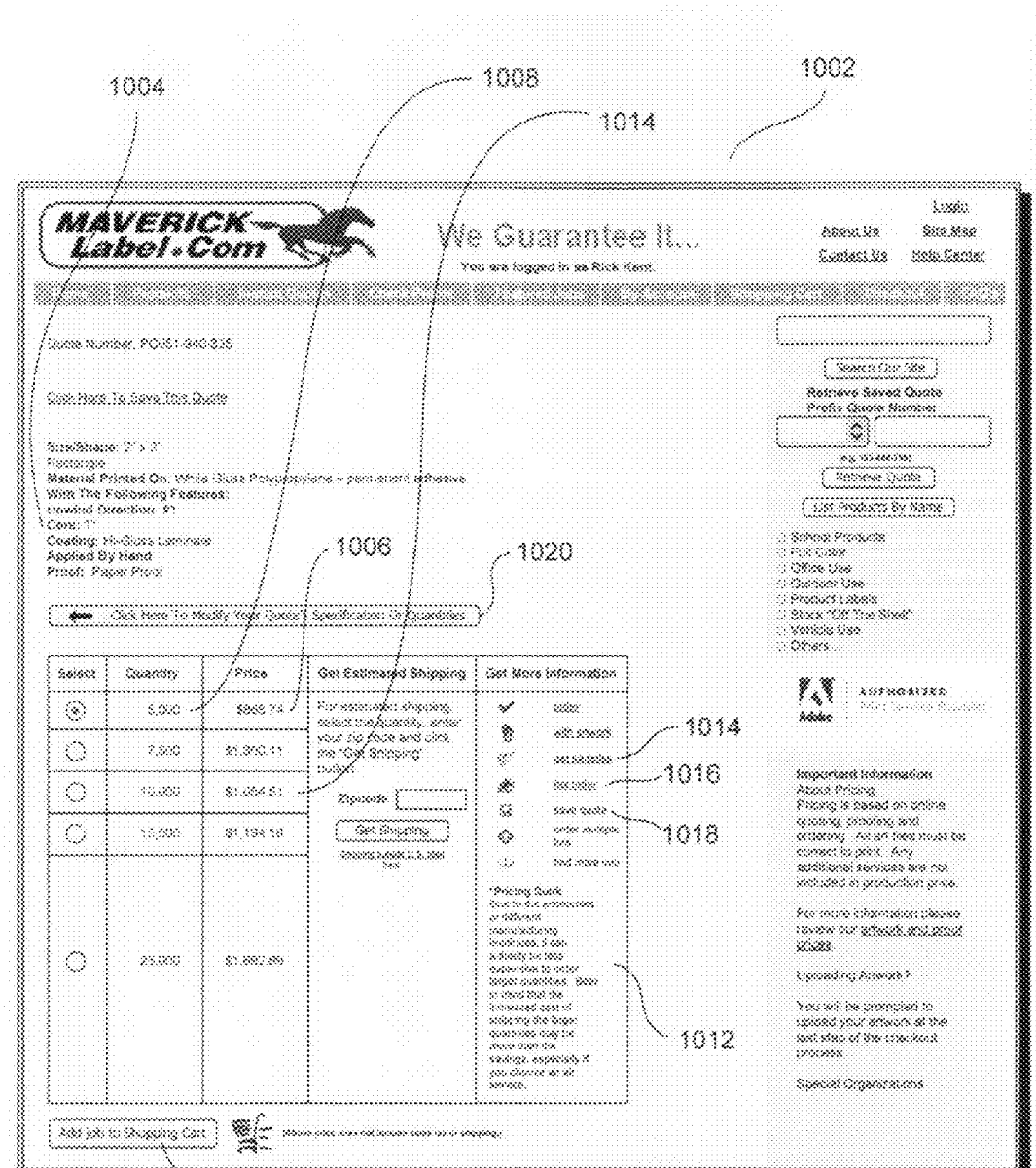
FIG. 10 shows the simple, exemplary quote-solicitation page corresponding to the quote-solicitation form shown in FIGS. 9A-B.

When the quote-solicitation form has been completed by the customer through feature selection and data entry using the customer's web browser, the customer can input a mouse click to a submit button 912 in order to solicit a quote from the virtual printed-label retailer for the desired printed label. In response to receiving the completed quote-solicitation form, the virtual printed-label retailer may display a corresponding quote on a quote-solicitation page returned to the customer's web browser. FIG. 10 shows the simple, exemplary quote-solicitation page corresponding to the quote-solicitation form shown in FIGS. 9A-B. The quote-solicitation page 1002 includes a description of the desired printed label 1004 and a list of quoted prices, such as quoted price 1006, for various different quantities of the desired label. For example, the quoted price $866.74 (1006 in FIG. 10) is quoted for an order of 5000 (1008 in FIG. 10) of the labels specified in the text description 1004, originally input through the quote-solicitation form shown in FIGS. 9A-B. The customer may select any of the displayed quantities, and input a mouse click to the add-job-to-shopping-cart button 1010 in order to order the printed labels.

In the exemplary quote-solicitation page shown in FIG. 10, the vendor that has been selected by the virtual retailing system to furnish the desired printed label to the customer is not shown or in any way identified. As far as the customer is concerned, the printed label may be sold by the virtual printed-label retailer. In alternative embodiments of the virtual printed-label retail facility, the identity of vendors may be displayed, and quotes for a particular number of the lowest-cost vendors for a desired label may be shown in sorted order, to allow a customer to choose a printed-label product based not only on price, but also on manufacturer. Many other embodiments of the virtual printed-label retail facility are possible, as well. In some embodiments, even additional, more detailed information may be provided to a customer with regard to labels that may be obtained through the virtual printed-label retail facility. In other embodiments, even less information may be provided. For example, in the exemplary quote-solicitation page shown in FIG. 10, quotes are provided for quantities greater than the desired quantity, to encourage customers to order additional product when the customer may achieve a significant price reduction by doing so. The exemplary quote-solicitation page shown in FIG. 10 also includes an informational footnote 1012 with respect to one quote 1014 to explain why the per-label price is so much less than the per-label price for a smaller quantity of the printed label. The exemplary quote-solicitation page provides additional features to a customer, including features that allow a customer to fax an order 1016 rather than to order through the Internet, to save the quote 1018 for future use, and other such operations.

Returned quotes allow a customer to choose a printed label product that meets the customer's price, delivery time, shipping-expense, and other criteria. For example, a customer may choose to order printed labels at a higher price, providing that they can be shipped to the customer on or before a specified date. A customer may choose printed labels with particular features or manufactured with special materials that are quoted at a higher price than less desirable printed labels. In other cases, a customer may select a printed label based soley on price. Many customer interfaces allow a customer to specify the criteria that the customer intends to base a decision on, to allow the printed-label retailer to provide quotes that range in values over the specified criteria, allowing a customer to consider tradeoffs and advantages across a spectrum of possible purchases. Criteria may include price, shipping costs, delivery times, product characteristics, shipping means, shipping distance, and other such criteria.

Although, in the described virtual-printed-label-retail-facility embodiment of the present invention shown, in part, in FIGS. 9A-10, the identity of vendors providing printed labels at quoted prices are not shown, an administrator of the virtual printed-label retailer's computing and data-storage system may view vendor, customer, and customer-input information using various administrative tools. FIG. 11 shows additional information, available to an administrative user of the described embodiment, underlying the quote shown in FIG. 10. As can be seen in FIG. 11, the virtual printed-label retailing system considered three different quotes 1102-1104 from three different vendors in order to select a final quote for the customer. The system chose to quote the printed-label product offered by Northwest Flexo 1103, even through the quote provided by Northwest Flexo is identical to the quote provided by Discount Labels 1104, based on additional criteria considered by the virtual printed-label retailing system. In the present case, one additional criterion considered by the virtual printed-label retailing system is that Northwest Flexo is a printed-label vendor preferred by the virtual printed-label retailer for one or more reasons.

Figure 12:
FIG. 12 shows a quote-solicitation page returned to the customer, in the exemplary dialog discussed with reference to FIG. 9A-17, when the customer has chosen to modify the original quote, shown in FIG. 10, to a quote for a lesser number of printed labels.
Figure 14:
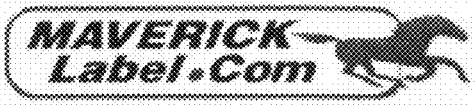
FIG. 14 shows a quote-solicitation page resulting from an additional modification of the quote discussed with reference to FIG. 12.

FIG. 12 shows a quote-solicitation page returned to the customer, in the exemplary dialog discussed with reference to FIG. 9A-17, when the customer has chosen to modify the original quote, shown in FIG. 10, to a quote for a lesser number of printed labels. As can be seen on the quote-solicitation page shown in FIG. 10, a quote-solicitation page may provide an input feature (1020 in FIG. 10) to allow the customer to modify the input criteria for the quote. FIG. 13 shows additional information, available to an administrative user of the described embodiment, underlying the modified quote shown in FIG. 12. In this case, quotes 1302 and 1304 from only two vendors are considered by the virtual printed-label retailing system, because Northwest Flexo does not sell quantities of the specified printed labels below 5000. FIG. 14 shows a quote-solicitation page resulting from an additional modification of the quote by a customer. The quote-solicitation page shown in FIG. 14 results from a customer indicating a desire for a quote on 500 printed labels, rather than 1000 printed labels in the desired quote shown in FIG. 12. FIG. 15 shows additional information, available to an administrative user of the described embodiment, underlying the modified quote shown in FIG. 14. As shown in FIG. 15, only a single quote 1502 is considered by the virtual printed-label retailing system, because Ross Printing Company is the only vendor for color process labels that furnishes labels in quantities of less than 1000.

Figure 16:
FIG. 16 shows a quote-solicitation page received by a customer after the customer has again modified the quote-solicitation information, in this case changing the type of printed label desired.

FIG. 16 shows a quote-solicitation page received by a customer after the customer has again modified the quote-solicitation information, in this case changing the type of printed label desired. Comparing the printed-label description 1602 in the quote-solicitation page shown in FIG. 16 with that in the previous quote-solicitation pages shown in FIGS. 14, 12, and 10, it can be observed that the customer has now solicited a quote for a custom shaped and sized printed label, rather than a standard printed label. FIG. 17 shows additional information, available to an administrative user of the described embodiment, underlying the modified quote shown in FIG. 16. As can be seen in FIG. 17, two quotes 1702 and 1704 are considered for the specified custom label. In this case, because the Ross Printing Company already has custom dies and facilities for printing the desired custom label, while Northwest Flexo would have to procure the necessary equipment, the Ross Printing Company furnishes a lower quote, which is selected and displayed by the virtual printed-label retailer on the quote-solicitation page shown in FIG. 16.

Considering the simple, exemplary customer-retailer dialog discussed above with reference to FIGS. 9A-17, and further considering the complexity of the software system needed to implement a full customer-interface/vendor-interface cross-product-like connectivity, as discussed with reference to FIGS. 6 and 8, it is clear that the engineering and maintenance effort needed for a virtual printed-label retailer to provide a uniform, transparent interface through a virtual printed-label retail facility by developing special software interfaces for each customer-interface/vendor/vendor-interface combination would be prohibitively expensive and time consuming. Moreover, the virtual printed-label retail facility interface that would be produced by such an effort would be hopelessly outdated, because vendor capabilities and offerings may change quite frequently, far more quickly than it would be possible for a virtual retailer to monitor and develop interfaces for, within a centralized, virtual printed-label retailer computing and data-storage system. In many cases, vendor capabilities and offerings may change in time frames of minutes and hours, as orders are received and processed by the vendors. Therefore, virtual printed-label retailers have recognized the need for a more economical, flexible, and dynamic method and system for interconnecting customers with printed-label vendors through a virtual printed-label retailing facility.

Figure 18:
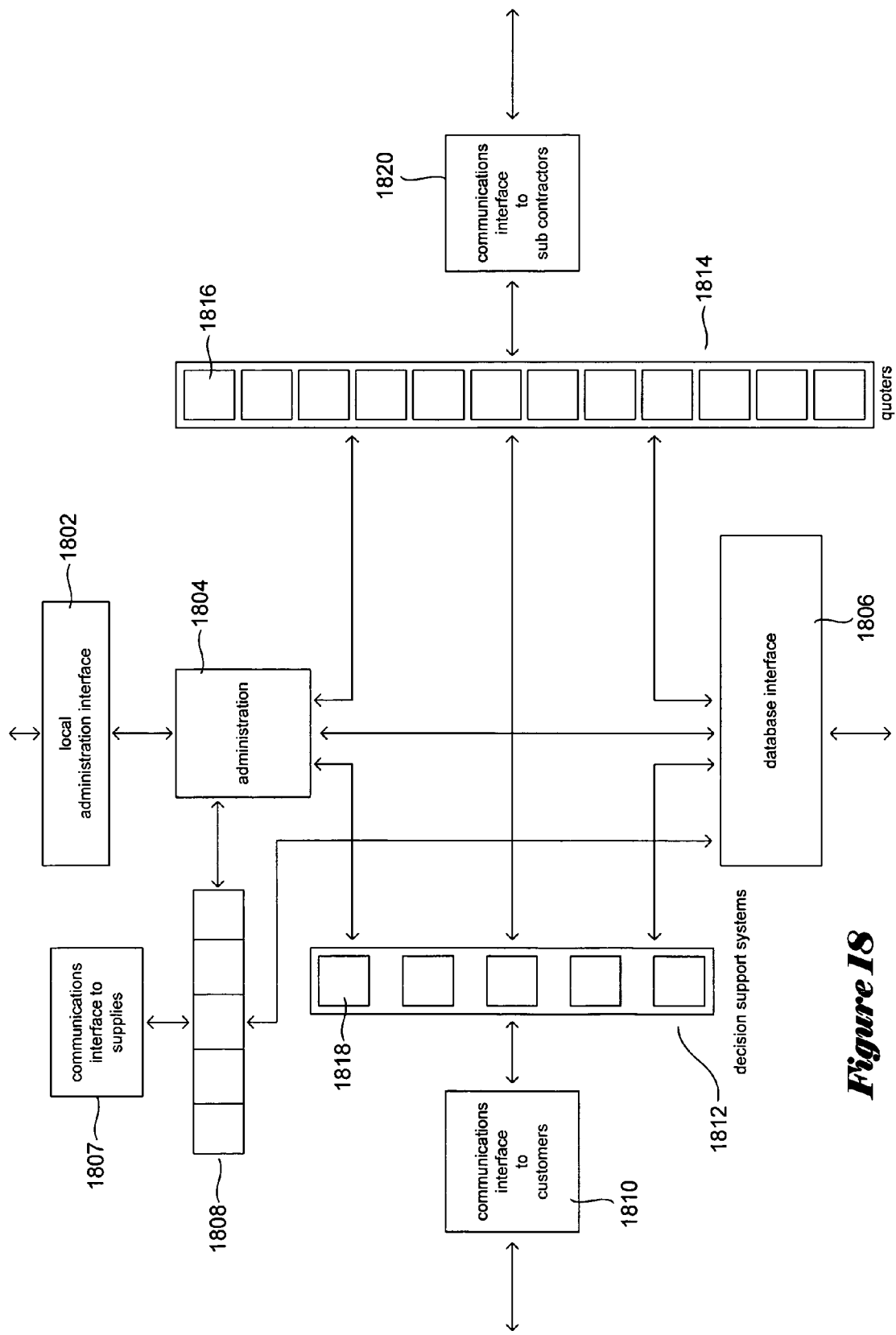
FIG. 18 shows an architectural overview of a flexible and dynamic printed-label retailing computing system.

FIG. 18 shows an architectural overview of a relatively flexible and dynamic printed-label retailing computing system. The architectural overview shown in FIG. 18 outlines the top-level computing processes and modules for a virtual or hybrid printed-label retailing system that executes within a centralized or distributed virtual-printed-label-retailer computing and data-storage system. The system includes a local administration interface 1802 provided to virtual printed-label-retailer personnel by an administration module 1804 comprising a large number of administration routines for configuring and managing the system, as well as for providing a wide range of functionality needed by, and made available to, internal personnel of the virtual or hybrid printed-label retailer. These facilities include facilities for monitoring operation of the system, for evaluating and adding new vendors, for managing internal operations and interfacing with various suppliers and vendors of office materials and other materials and equipment needed by the virtual or hybrid printed-label retailer.

The retailing system includes a database interface 1806 to allow processing entities and routines to access information locally stored in a database. The system may include a communications interface to suppliers 1807, and various routines for managing relationships and exchanges with suppliers 1808. In the case of hybrid retailers, which manufacture and print certain types of labels, but, for other types of labels, forward customer orders to subcontractors, the suppliers may include suppliers of raw materials and equipment for printing labels and the administration module 1804 may include many additional facilities for organizing and managing the manufacturing and printing operations.

Remote customers access the retailing system through a first communications interface 1810. The first communications interface may include Internet ports and operating-systems routines that allow information to be exchanged on the Internet through the Internet ports, but may also include a wide variety of additional types of communications interfaces, including interfaces that allow faxed quote-solicitation and order forms to be received through telephone lines, interfaces that allow sales personnel to enter order information from terminals at retail sites, interfaces that allow XML files representing quote-solicitation pages and order forms to be received and processed, and additional communications channels.

A set of decision support systems ("DSSs") 1812 manage interactions between customers communicating with the system through any of the communications interfaces supported by the communications interface module 1810 and the retailing system. A decision support system may be instantiated for each customer/retailer dialog, and a different type of decision support system may be instantiated for each different type of communications medium. Each instantiated DSS can access the database interface 1806, the communications interface module 1810, various administration facilities 1804, and can instantiate and communicate with one or more quoters 1814.

A quoter, such as quoter 1816, is instantiated for each vendor considered by a DSS for order fulfillment, such as DSS 1818, to facilitate formulation of quotes and placement of orders by the DSS in response to design specifications, quote-solicitations, and orders received by the DSS from customers. In many embodiments, a quoter is instantiated for each different vendor/product-line or vendor/product pair. In certain embodiments, a quoter may be instantiated for each vendor/product-line/customer triple. In alternative embodiments, quoters may be dynamically directed to different vendors and products, and a quoter may be instantiated and associated with each DSS. Each quoter may access the data base interface 1806 as well as a second communications interface 1820 by which a quoter can access a remote vendor interface to obtain current information needed to provide quote information to a DSS, as well as to place orders with the vendor. Quoters are instantiated quoter classes, and all quoter classes are hierarchically derived from a common quoter base class. Thus, quoters provide a well-defined and well-structured interface to remote vendors that can be used by the various DSSs. Each quoter includes the logic and stored information, or access to stored or vendor-supplied information and routines, to allow the quoter to interface with the local database or with remote vendors in order to obtain information needed to respond to inquiries made of the quoter by a DSS through quoter member functions. Moreover, quoters can be implemented by vendors, rather than by the virtual printed-label retailer, and readily incorporated into the virtual printed-label retailer's computing and data-storage system. The virtual printed-label retailer's computer system can be designed to accept new or updated quoter classes from vendors via digital communications methods, and to automatically incorporate the new or updated quoters into the system. Thus, rather than attempting to engineer a complex, centralized system, such as the complex, centralized system discussed above with reference to FIGS. 6 and 8, the virtual printed-label retailer needs only to define the quoter classes and make the defined quoter class hierarchy available to vendors to provide a means for each vendor to supply implemented quoter classes, rather than attempting to track and maintain internal interfacing software for communicating with each vendor interface. Using the architecture shown in FIG. 18 that represents one embodiment of the present invention, the software engineering and development costs for the virtual printed-label retailing system are essentially scale invariant with respect to the number of vendors to which the virtual printed-label retailing system interconnects customers.

Figure 19:
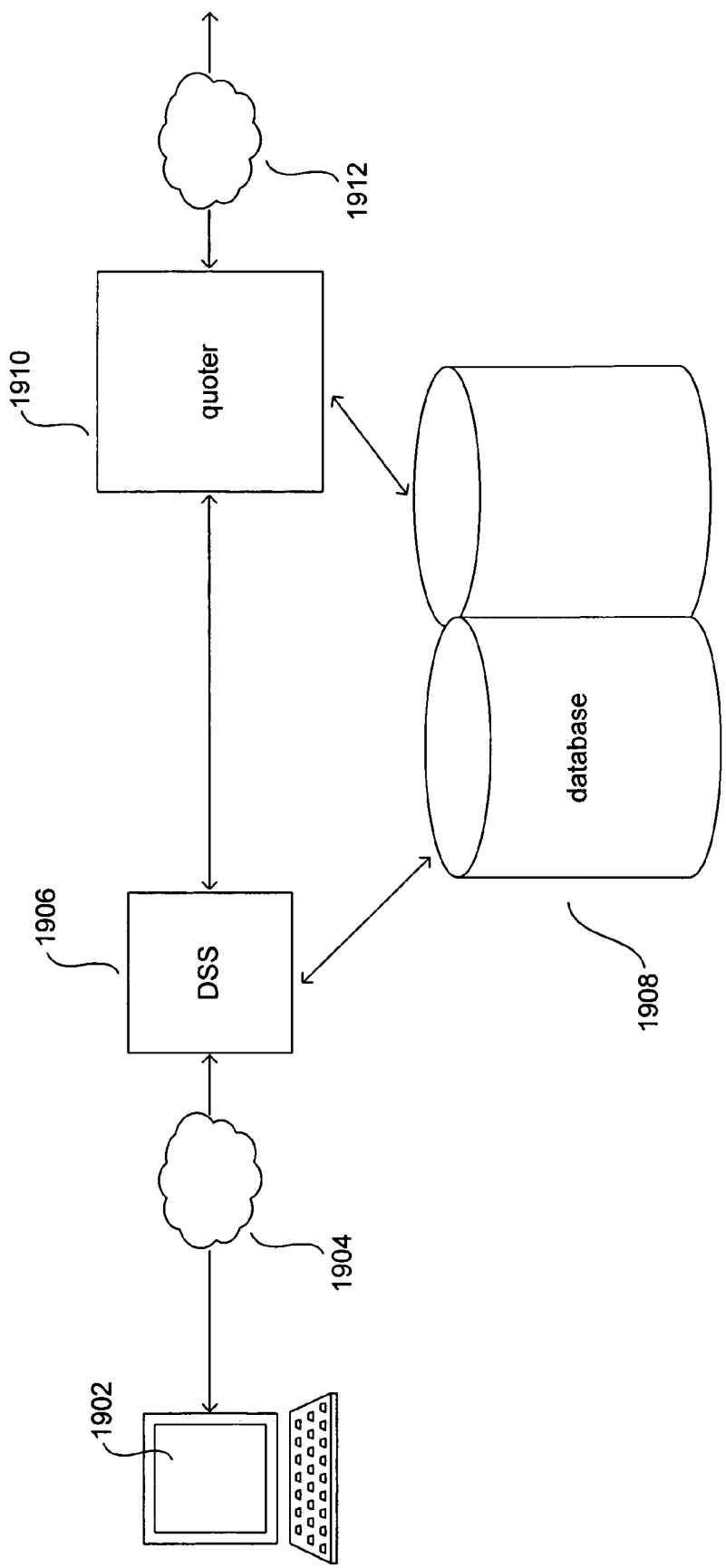
FIG. 19 illustrates information exchange, storage, and retrieval during quote solicitation and order fulfillment via a web-based customer interface in the virtual printed-label retailing system shown in FIG. 18.

FIG. 19 illustrates information exchange, storage, and retrieval during quote solicitation and order fulfillment via a web-based customer interface in the virtual printed-label retailing system shown in FIG. 18. FIG. 19 is provided to illustrate the conceptual interfaces employed within the virtual retailing system for information exchange. As shown in FIG. 19, a customer interfaces to the virtual printed-label retail facility via a virtual internet-based storefront displayed to the customer by a web browser running on the customer's personal computer 1902. The web browser, in turn, interfaces to the virtual printed-label retailing system via any of various communications media 1904 to a DSS 1906 instantiated within the virtual printed-label retailing system in order to manage interaction with the customer. The DSS 1906 interfaces with a data base 1908 incorporated within the virtual printed-label retailing system and with one or more quoters 1910 instantiated by the DSS to obtain information concerning various product/vendor combinations used by the DSS to prepare quotes and to place orders. The instantiated quoter 1910 interfaces with the database 1908 and interfaces, via the Internet and other communications media 1912, to vendor interfaces provided by the different vendors of printed labels to which the virtual printed-label retailing system may direct quote solicitations and orders.

One example of a customer interface is discussed above with reference to FIGS. 9A-17. Any of many other alternative embodiments of web-site interfaces are possible and, as discussed above, many additional types of interfaces can be provided for exchanging information with customers, including systems for receiving and sending faxes, automated systems for receiving information from sales representatives and displaying information to sales representatives, automated facilities for exchanging information encoded in XML documents, and other such communications media.

The interface provided by a DSS is encoded in the class definition for a DSS class. FIG. 20 illustrates internal and public member functions that together comprise a DSS class definition in one, exemplary embodiment of the present invention. The internal function members may include function members that constitute an interface to lower-level operating system and communications routines 2002 and that provide an interface to a data base management system 2004. In FIGS. 20 and 23, discussed below, member function definitions are provided in an informal fashion, without strong type declarations, and using the symbol "&" to indicate a variable passed by reference. Internal member functions may include functions for displaying or presenting a customer interface 2006, for updating a displayed customer interface 2008, and for receiving parameters and information input to the displayed customer interface 2010. Internal member functions may further include functions for computing product/vendor pairs appropriate for a particular, specified printed label 2012, for instantiating a quoter corresponding to a product/vendor pair 2014, for obtaining a quote from a particular quoter 2016, for placing an order through a particular quoter 2018, and a general routine for managing a dialog with a remote customer 2020 for design specification, quote solicitations, and placement of orders. Public member functions may include a constructor 2022, a destructor 2024, and a status routine 2026 that may be called to ascertain the status of an ongoing customer/virtual-printed-label-retailing-system dialog.

Figure 21:
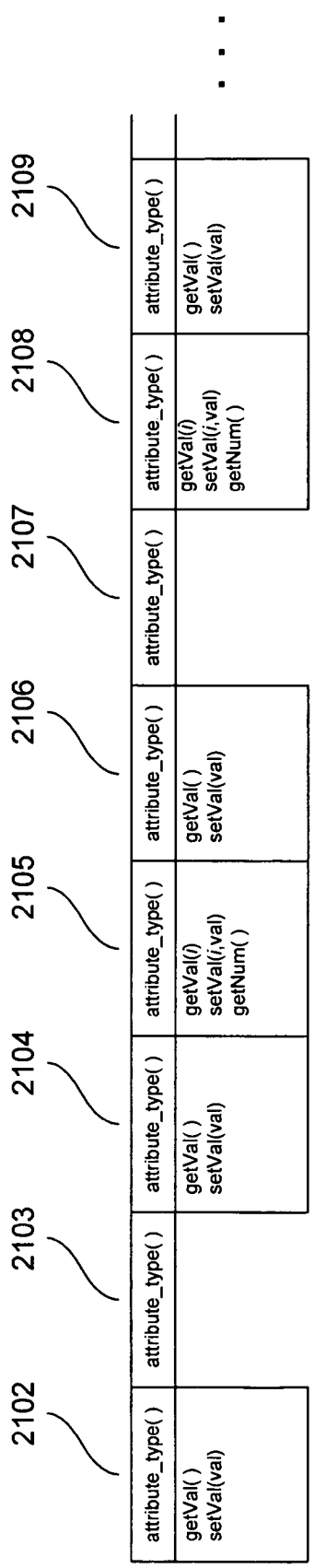
FIG. 21 illustrates an attribute array.

A DSS, in many embodiments of the present invention, collects information from a customer through a customer interface in order to accumulate a list of attributes and attribute values that together specify a design for a particular printed-label order. The collected attributes can be considered to be a variable length array of instantiations of a hierarchically defined set of attribute classes that may be passed as an argument to quoters in order to place orders and solicit quotes. FIG. 21 illustrates an attribute array. The attribute array shown in FIG. 21 includes attributes 2102-2109 shown in FIG. 21, and may contain an arbitrary number of additional attributes. All attribute instances include at least an attribute type member function for retrieving an attribute type from the attribute instance. Certain attributes, such as attributes 2103 and 2107 in FIG. 21, include only an attribute type interface. Other types of attribute instances, such as attributes 2102, 2104, 2106, and 2109 in FIG. 21, include, in addition to an attribute type retrieving function, functions for storing and retrieving a single attribute value of a particular type, such as an integer or character string, associated with the attribute instance. A more complex attribute instance may include multiple attribute values, such as attributes 2105 and 2108 in FIG. 21. The single-value attribute instances, such as attribute 2102, are shown in FIG. 21 to include getVal and setVal functions for extracting and storing an attribute value, respectively, and the multiple-valued attribute instances, such as attribute 2105, include parameterized getVal and setVal functions to allow for extraction and storage of each of multiple attribute values using an attribute-value index. More complex attribute instances may have multiple attribute values with multiple different attribute-value types. In alternative embodiments, attributes and attribute values may be stored in simple one-dimensional or two-dimensional integer arrays, or other non-object-oriented data structures. In yet additional embodiments, the DSS may employ metadata, stored within a database, encoded within DSS routines, or included in messages exchanged with customers, to define and characterize attributes and parameters.

Figure 22:
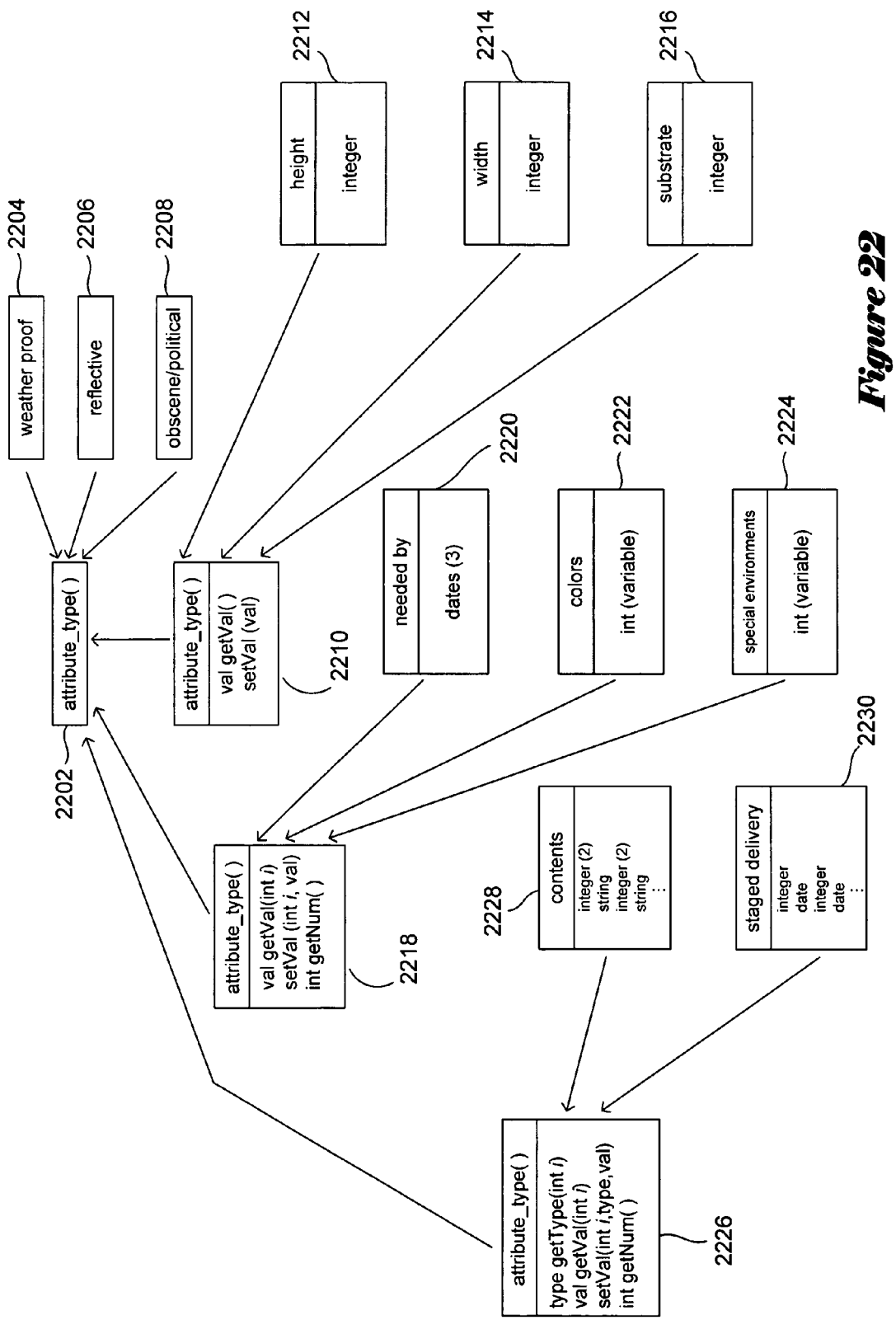
FIG. 22 illustrates a hierarchically derived set of attribute classes that may be used for specifying printed labels in one embodiment of the present invention.

FIG. 22 illustrates a hierarchically derived set of attribute classes that may be used for specifying printed labels in one embodiment of the present invention. The base attribute class 2202 includes a single member function "attribute_type( )." Instances of the base attribute class can be used to store a single attribute that is not associated with an attribute value. For example, specific attribute classes derived from the base attribute class include attribute classes that specify that a printed label is waterproof 2204, reflective 2206, and containing obscene or political information 2208. An attribute class derived from the base class 2210 can be used to store single-valued attributes, and includes member functions for extracting from, and storing values in, an instance of the single-value-attribute class. Additional derived classes, not shown in FIG. 22, may be used for specific types of attribute values, including single-attribute-value classes for storing integers, character strings, characters, floating point numbers, and other such basic types. For example, as shown in FIG. 22, single-value attribute classes may include attribute classes for storing the height of a printed label 2212, the width of a printed label 2214, and the type of substrate for a printed label 2216, where the substrate type is encoded as an integer. A second type of derived attribute class 2218 allows for storing multiple attribute values all having a single type. For example, derived multiple-valued attribute classed may include an attribute class for storing dates specifying most preferred, preferred, and required dates for receiving an order 2220, an attribute class for storing a variable number of colors in which information displayed on a printed label is to be printed 2222, colors encoded as integers, or enumerations, and an attribute class for storing indications of special environments in which the printed label is intended to be used, each environment encoded as an integer 2224 or enumeration. Finally, an attribute class 2226 is derived from the base attribute class 2202 for storing multiple attributes of multiple types. For example, an instance of the multiple-value-multiple-type attribute class may include a derived attribute class for storing the informational content of the printed label, with each separate piece of information stored as two position-specifying integers and a string containing the text information to be displayed 2228. Another example of a derived multiple-value-multiple-type attribute class is an attribute class 2230 that stores a series of integer/date pairs specifying the quantities of a particular type of printed label to be delivered, in a staged delivery, at specified dates. Many different attribute class structures or alternative attribute-encoding data structures may be employed in alternate embodiments of the present invention. In simple schemes, each different attribute may be encoded as a different integer, and all attribute values may be mapped to integers. Slightly more complex encodings may include different types of attribute-value data, including floating point numbers, characters, strings, and other such low-level data types. An attribute-class based object-oriented approach may specify attributes and attribute values of arbitrary complexity in flexible, dynamic, object-oriented implementations.

FIG. 23 illustrates the quoter interface presented by an instantiated quoter to a DSS. The quoter interface, like the previously described DSS interface, is represented as internal and public member functions that comprise a generalized object-oriented interface. Internal member functions include member functions that provide an interface to lower-level operating system and communications routines 2302, routines that provide an interface to one or more associated databases 2304, and routines that provide a communications interface, via a local communications interface, to a specific vendor and specific remote vendor interfaces 2306. These member functions may, in turn, invoke interface member functions of additional classes that represent operating systems, database systems, and other components of the retailing system. Public member functions include: (1) a validate function 2308 that allows a DSS to furnish a list of attributes that specify an order and a quote variable for receiving a quote number assigned to the specified order to a quoter which then determines whether or not the vendor associated with the quoter can fulfill the order described by the attributes and, if the quote is validated, assigns a quote number to the quote variable; (2) a quote member function 2310 that furnishes a price quote for a particular, previously validated quote number by the vendor associated with an instance of the quoter class; (3) a weight member function 2312 that returns a weight for a shipment of specified order corresponding to a previously validated quote number; (4) production date and time member functions 2314 and 2316 that return estimated start date and elapsed time for production of an order corresponding to a previously validated quote number; (5) a ship date member function 2318 that returns an estimated date on which the order corresponding to a previously validated quote number will be shipped; (6) a member function for placing an order corresponding to a previously validated quote number 2320; and (7) a constructor and destructor 2322 and 2324. As with the DSS class described above, many different embodiments of the quoter class may be defined and employed in alternative embodiments of the present invention, including different partitioning of quoter functionality between different types of member functions using different arguments and return values as well as non-object-oriented quoter functions providing functionality equivalent to the functionality provided by alternative embodiments of object-oriented quoter classes, such as the quoter class described with reference to FIG. 23.

Next, high-level control-flow diagrams are provided to describe the functionality of a virtual or hybrid retailing system, referred to as an "überquoter," that represents one embodiment of the present invention, as well as the functionality of an instance of the DSS class described above and a representative quoter-class member function. These control-flow diagrams, in combination with the above-described interfaces and architectural overview, provide a complete, high-level description of various virtual retailing system embodiments of the present invention.

Figure 24:
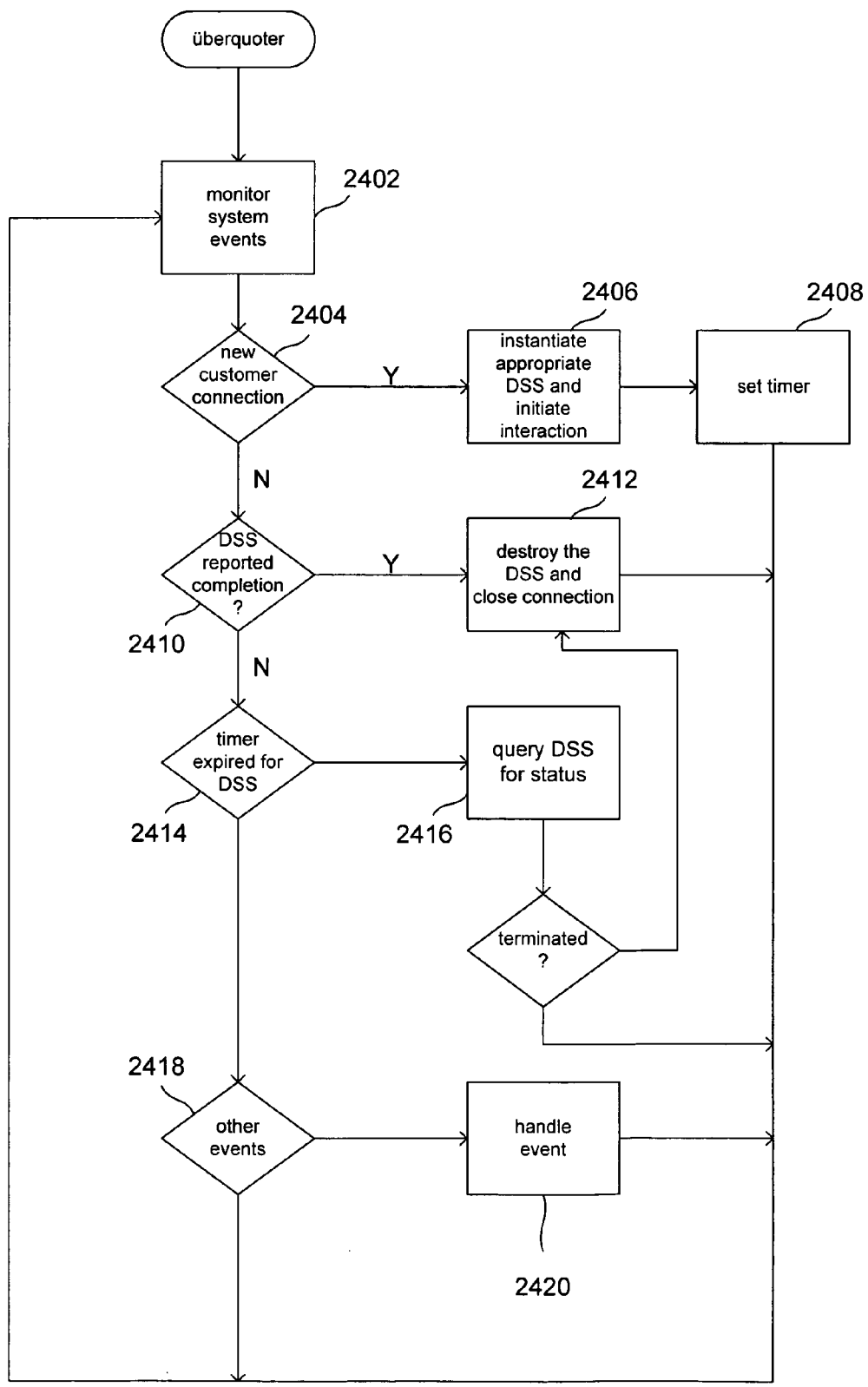
FIG. 24 shows a control flow diagram for the überquoter.

FIG. 24 shows a control flow diagram for the überquoter. The überquoter, at its core, continuously executes a central, core loop in which the überquoter detects events and appropriately responds to detected events. In step 2402, the überquoter monitors the retailing system for the occurrence of a next event. When the next event is detected, the überquoter, in step 2404, determines whether the event corresponds to a new customer connection. If so, then in step 2406, the überquoter instantiates an appropriate DSS to handle the customer connection and initiates the customer/überquoter interaction. Then, in step 2408, the überquoter sets a timer associated with the newly established customer/überquoter interconnection. Control then flows back to the monitoring step 2402. Otherwise, if the new event corresponds to reporting of completion of a customer/überquoter dialog by a DSS, as detected in step 2410, then the überquoter destroys the DSS and closes the communications connection or port in step 2412. Otherwise, if the newly detected event corresponds to a timer expiration, as detected by the überquoter in step 2414, then the überquoter queries the DSS for the current status of the DSS, in step 2416, and either terminates the DSS, in step 2412, when the DSS indicates that the customer/überquoter dialog has terminated or aborted, or otherwise returns to the monitoring step 2402. Otherwise, if some other type of event has occurred, as detected by the überquoter in step 2418, then the überquoter calls an appropriate routine to handle the detected event, in step 2420. Other types of events include events arising during interactions with administrative personnel through an administrative interface, operations-related events, including transactional events, events arising from internal operations and management, and many other types of events.

Figure 25:
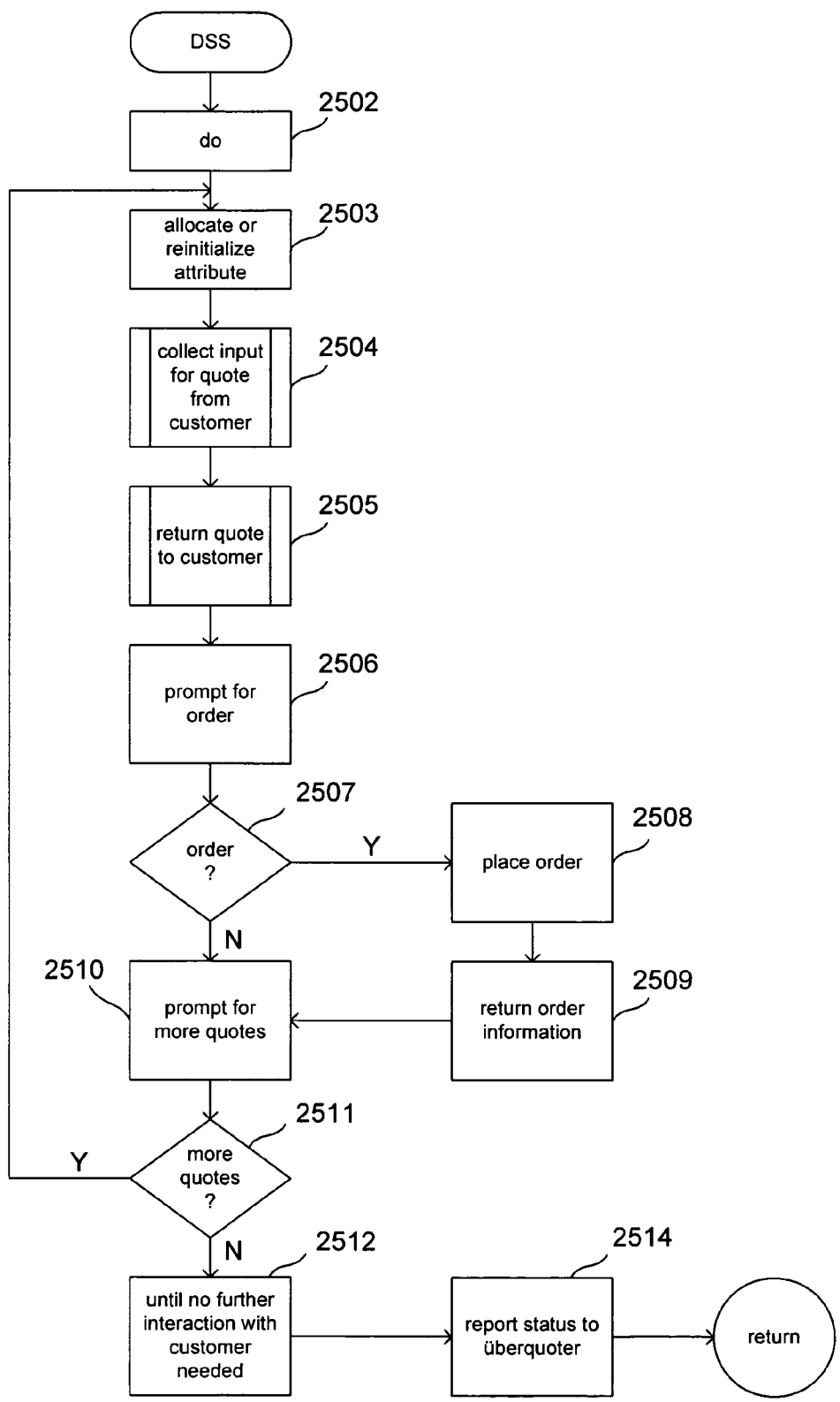
FIG. 25 illustrates operation of an instantiated DSS.

FIG. 25 illustrates operation of an instantiated DSS. The instantiated DSS continuously executes the do-loop of steps 2502-2512 until further dialog with the customer is not needed, and then reports a final status to the überquoter, in step 2514, before returning. The do-loop of steps 2502-2512 represents an interactive dialog with a customer in which the DSS collects input in order to receive a design specification, solicit a quote, and take an order for a particular product from the customer. In step 2503, the DSS allocates or re-initializes an attribute list. In step 2504, the DSS collects input for a quote solicitation from the customer, and then, in step 2505, obtains a quote through a call to one or more quoter objects and compiles the results from the quoter objects into a quote that can be returned to the customer. In step 2506, the DSS prompts the customer for an order and, when the customer chooses to order the quoted product, as detected in step 2507, places the order through the quoter object, in step 2508, and returns order information in step 2509. The DSS prompts the customer for additional quotes, in step 2510, and carries out the next iteration of the do-loop when the customer desires an additional quote. Many different DSS implementations are possible, including more implementations that provide more types of customer/retailing-system interactions, that allow for a more complex suite of customer quote-solicitation interactions, and that provide many additional features.

Figure 26:
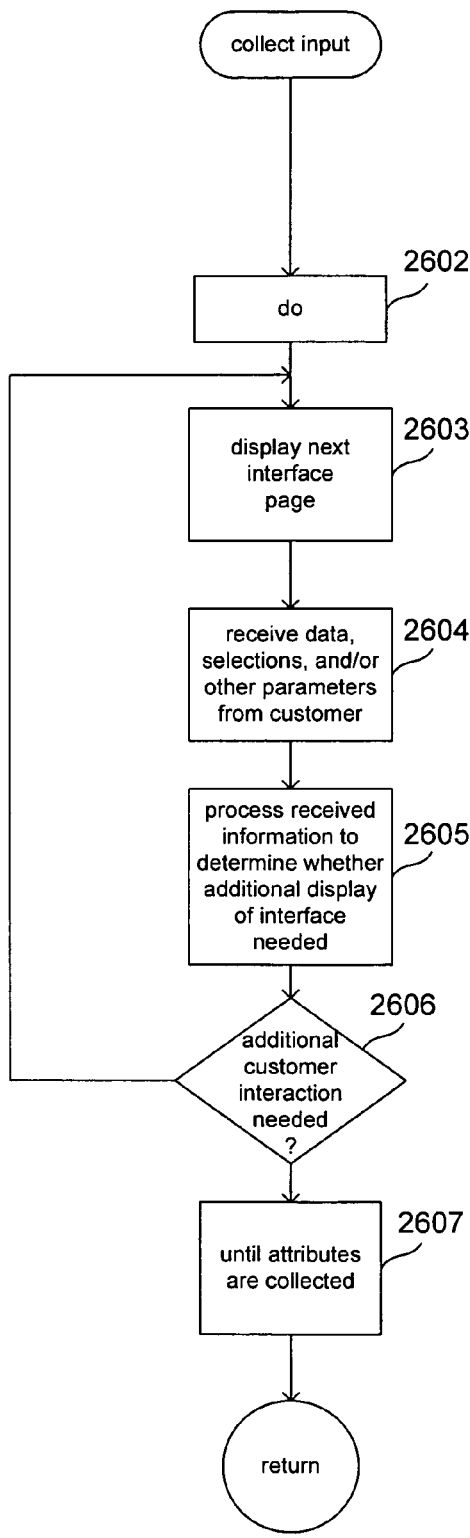
FIG. 26 is a control flow diagram for the routine "collect input" called in step 2504 of the control-flow diagram shown in FIG. 25.

FIG. 26 is a control flow diagram for the routine "collect input" called in step 2504 of the control-flow diagram shown in FIG. 25. The routine "collectInput" is essentially a continuously executed do-loop that provides an interaction with a customer sufficient to collect attributes adequate for soliciting a quote from a vendor in the do-loop comprising steps 2602-2607. In step 2603, the routine "collectInput" displays a next interface page, or other such dialog entity, to a customer including, in the first iteration of the do-loop, an initial page or other information-collecting entity. Next, in step 2604, the routine "collectInput" receives data, selections, and/or other parameters from the customer in response to the displayed interface page, and, in step 2605, processes the received information to determine whether or not additional display of interface pages or further update of displayed interface pages is needed. If additional customer interaction is needed, as determined in step 2606, then control flows back to step 2603. Otherwise, a completed attribute list has been compiled, for subsequent use by the DSS to solicit a quote or place an order.

Figure 27:
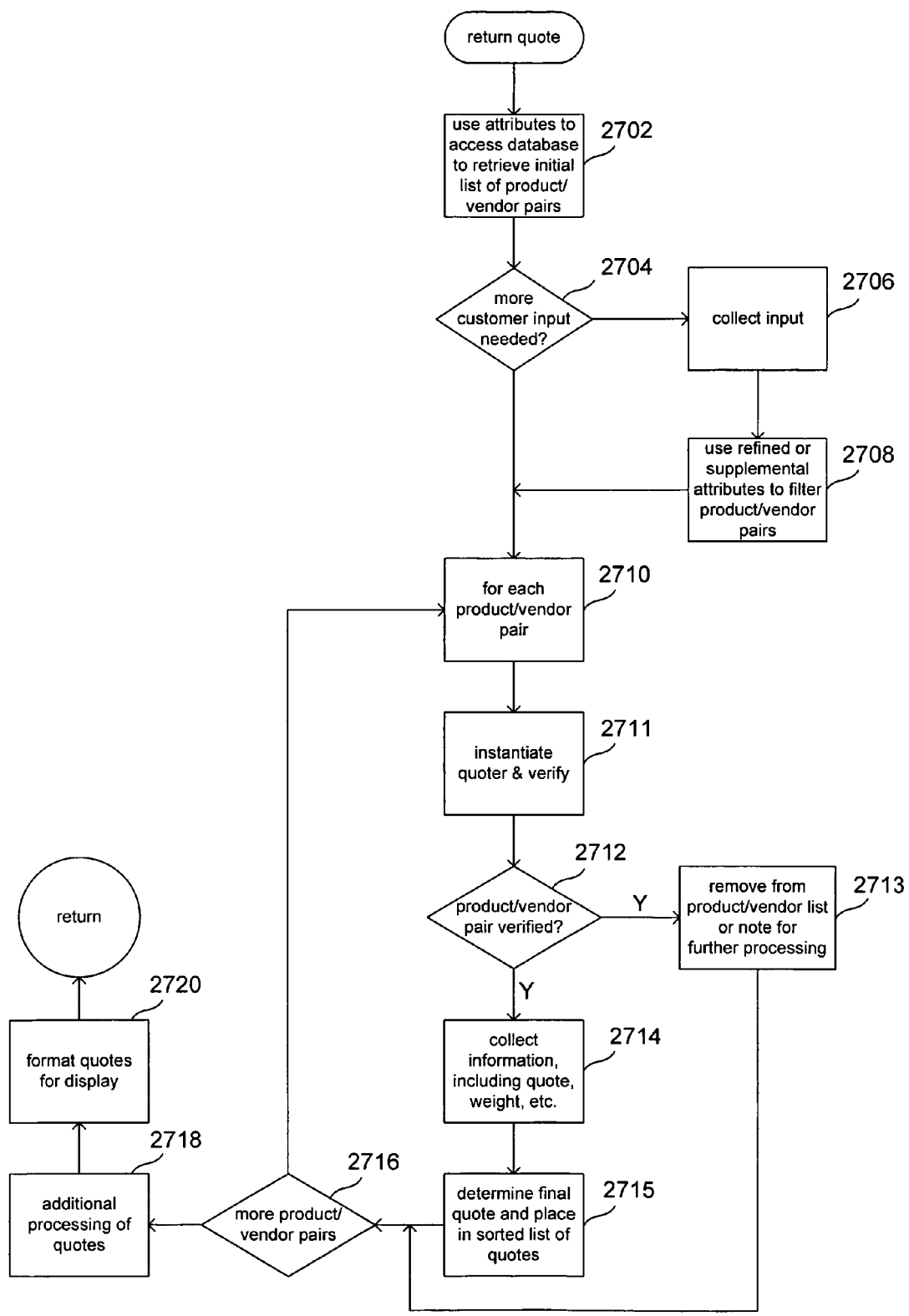
FIG. 27 is a control-flow diagram of the routine "return-Quote" called from step 2505 of FIG. 25.

FIG. 27 is a control-flow diagram of the routine "returnQuote" called from step 2505 of FIG. 25. In step 2702, the DSS uses a list of attributes returned by the routine "collectInput" to access a local data base and retrieve a list of possible vendors or, in other words, a list of vendors that may offer the product category described by one or more of the attributes in the list of attributes. If more input from a customer is needed to refine the initial list of vendors, as determined in step 2704, then the routine "returnQuote" calls the routine "collectInput," in step 2706, to obtain additional input from the customer and, in step 2708, reuses returned or supplemented attributes to filter the initial vendor list returned in the database-access step 2702. Next, in the for-loop of steps 2710-2716, the routine "returnQuote" instantiates quoters for each vendor in the refined vendor list, obtains information from the vendor sufficient to produce a quote for the vendor, and assembles the information into an initial quote. In step 2711, the routine "returnQuote" instantiates a quoter for a next vendor selected from the vendor list and calls the verify function of the quoter to determine whether or not the vendor associated with the quoter can provide the product described by the attributes collected from the customer. If the vendor cannot provide the product, as determined in step 2712, then the vendor is removed from the vendor list or, in alternative embodiments, is marked for potential further processing in step 2713. Otherwise, in step 2714, the routine "returnQuote" collects any additional needed information from the instantiated quoter using quoter member functions, in step 2714, in order to determine a final quote for the specified order from the selected vendor. The determined final quote is placed in a sorted list of quotes in step 2715. Once all the vendors have been queried, in the for-loop of steps 2710-2716, the routine "returnQuote" may carry out additional processing and sorting of the quote list, in step 2718, and then formats a final quote for display to the customer, in step 2720. Again, an almost limitless number of alternative embodiments are possible, including many different strategies for producing a final quote, such as selecting the best-priced quote, selecting the best-priced five quotes, or selecting a best quote or quotes by considering criteria in addition to price. The final quote may contain additional information and quotes for additional products and services.

Figure 28:
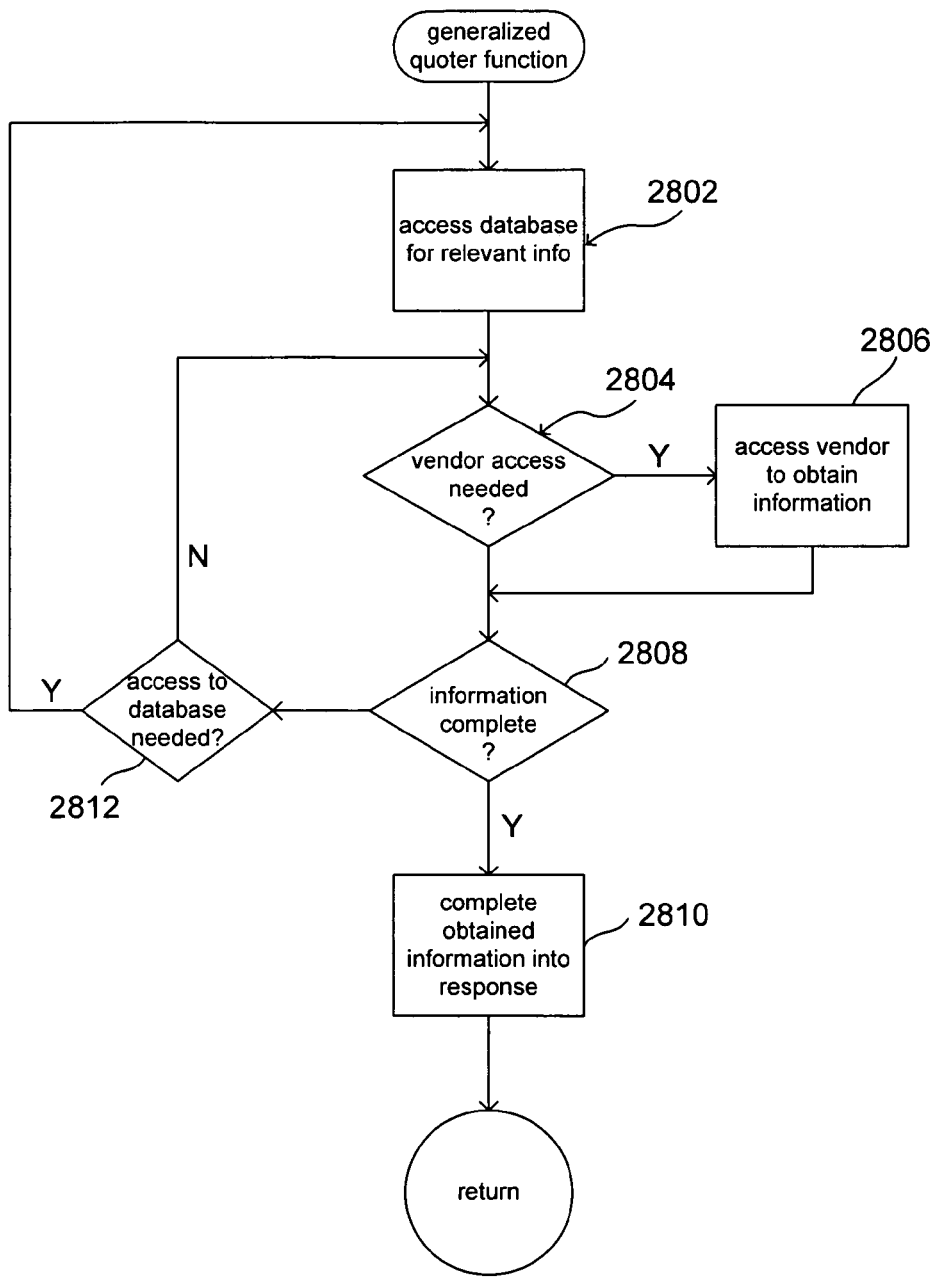
FIG. 28 is a control-flow diagram for a generalized quoter member function that returns information to a calling DSS.

FIG. 28 is a control-flow diagram for a generalized quoter member function that returns information to a calling DSS. In step 2802, the quoter accesses the local database of the retailing system for relevant information related to the inquiry corresponding to invocation of the quoter member function. Then, in step 2804, the quoter function determines whether the remote vendor associated with the quoter needs to be directly accessed, through a communications medium, in order to obtain additional information. When additional information is needed, the vendor is accessed, in step 2806, using lower level, internal member functions that provide an interface to a remote vendor. If the information obtained, at this point, is adequate to prepare a response, as determined in step 2808, then the response is compiled and returned in step 2810. Otherwise, if additional database access is needed, as determined in step 2812, then control flows back to step 2802. Otherwise, control flows back to step 2804. Thus, the quoter member functions generally access a local database and optionally accesses the remote vendor via a vendor-supplied interface in order to compile information requested by a call to the quoter member function. A vendor can choose to store relatively static information concerning vendor products in the local database of the retailing system, using administrative tools applied by the retailing system to update the database, as needed, and may alternatively choose to require a retailing-system quoter to dynamically access the vendor interface for more rapidly changing information. For example, the weights of various printed products may be relatively static, and not frequently changed, and may thus be stored in the retailing-system database, avoiding the inefficiency of remote access to a remote vendor interface for obtaining that information. On the other hand, information related to when an order can be shipped may be dependent on recent transaction activity carried out by the vendor, and the vendor may choose to require a quoter to access the vendor directly in order to prevent a need to refuse orders placed by customers when the vendor lacks current capacity for filling orders. In virtual retailing systems, it is natural to instantiate quoters for remote vendors. In hybrid systems, quoters may also be instantiated for products and services offered directly by the hybrid retailing system, as well.

Although the present invention has been described in terms of particular embodiments, it is not intended that the invention be limited to these embodiments. Modifications within the spirit of the invention will be apparent to those skilled in the art. For example, an almost limitless number of different retailing system implementations that represent embodiments of the present invention can be devised using different programming languages, modular organizations, control structures and data structures, databases, and a host of various other implementation parameters and characteristics. Functionality assigned to different entities within the retailing system described with respect to FIG. 18 may be partitioned differently between entities in alternative systems, including assigning functionalities to different types of entities with different functional interfaces. For example, although one described embodiment includes DSS instantiations for managing client/retail-system dialogs, alternative embodiments may not employ DSS instantiations, but instead may employ a multi-threaded dialog managing module or routine. Although the retailing system of the present invention has been described in terms of a printed-label-retailing application, embodiments of the present invention may be employed for retailing a variety of different types of products and services.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A method for receiving quote solicitations from remote customers and routing received quote solicitations to remote vendors within virtual and hybrid retailing systems, the method comprising:
   receiving information, by a retailing computing system, from a remote customer through a customer interface, that specifies a product design and order for the product desired by the remote customer;
   determining, by the retailing computing system, using information stored in memory or in a database within the retailing computing system, a list of one or more vendors that can fulfill the order;
   instantiating a quoter object for each vendor in the list of vendors; accessing, by the retailing computing system, each quoter object and obtaining quote-related information needed to formulate a quote for order fulfillment by the vendor associated with the quoter object, each quoter object including functionality for accessing information, including one or more of data and routines, stored within the retailing computing system to obtain all or a portion of the quote-related information and including functionality for accessing, through a communications interface, a remote vendor interface provided by the vendor associated with the quoter object to obtain all or a portion of the quote-related information;
   constructing and formatting, by the retailing computing system, a final quote using the quote-related information obtained from each quoter object; and
   returning, by the retailing computing system, the final quote to the customer.

2. The method of claim 1 wherein the quote solicitations are solicitations for quotes for printed labels.

3. The method of claim 1 wherein the customer interface is a website, pages of the website at least partially dynamically created by the retailing system for display by a customer's browser.

4. The method of claim 1 wherein the customer interface is an XML document reception interface that allows the retailing system to exchange information encoded in XML documents.

5. The method of claim 1 wherein the customer interface is an automated information exchange system used by sales personnel in retail outlets.

6. The method of claim 1 wherein the customer interface is an automated system for sending and receiving fax transmission.

7. The method of claim 1 wherein a quoter object provides an interface through which quote-related information for a specified order can be obtained, the quote-related information including one or more of:
   an indication of whether or not the vendor associated with the quoter object can fulfill the specified order;
   an indication of a price for the specified order; an indication of a shipment date for the specified order; an indication of a production date for the specified order; an indication of a production time for the specified order; and an indication of a shipment weight for the specified order.

8. The method of claim 1 wherein constructing and formatting a final quote using the quote-related information obtained from each quoter object further includes:
   selecting quotes for the specified order and formatting the selected quotes for return to the customer, the quotes selected on one or more criteria, the one or more criteria including:
   price;
   projected delivery time;
   product characteristics;
   shipping costs; and
   shipping distance.

9. The method of claim 8 wherein additional information is provided in the final quote, including price quotes for larger volume orders and pricing explanations.

10. The method of claim 1 wherein constructing and formatting a final quote using the quote-related information obtained from each quoter object further includes:
    listing quotes for the specified order from the vendors and formatting the listed quotes for return to the customer; and
    listing quotes for related products, to allow a customer to choose a potentially more desirable product that the customer did not specify.

11. A retailing system for retailing products provided by remote vendors to remote clients, the retailing system comprising:
    a first electronic communications interface in an electronic computer through which remote customers exchange information with the retailing system;

one or more decision support systems within the retailing system, each decision support system instantiated within an electronic computer managing an exchange of information between a customer and the retailing system to assemble a product design and order for the customer;

a plurality of quoter objects wherein a quoter object instantiated for each potential vendor within an electronic computer that fulfills an order assembled by a decision support system, the quoter object supplying quote-related information to the decision support system;

a second electronic communications interface through which the plurality of quoter objects exchange information with remote vendors; and an electronic database management system, the database management system storing information for retrieval by decision support systems and the plurality of quoter objects.

12. The retailing system of claim 11 wherein the first and second communications interfaces support exchange of information through on or more of:
an Internet-based communications protocol;
a website interface;
an XML document exchange interface; and
a facsimile document exchange interface.

13. The retailing system of claim 11 wherein the decision support system instantiated to manage an exchange of information between a customer and the retailing system prompts the customer for sufficient information to assemble a list of attributes and attribute values that together comprise an order.

14. The retailing system of claim 13 wherein the decision support system, having assembled an order specification, accesses the database management system to determine a list of vendors, each vendor in the list a potential vendor for the order.

15. The retailing system of claim 14 wherein the decision support system instantiates a quoter object for each vendor in the list of vendors and accesses the quoter object instantiated for the vendor to obtain quote-related information used to formulate a quote for fulfillment of the order by the vendor.

16. The retailing system of claim 11 wherein a quoter object provides an interface through which quote-related information for a specified order can be obtained by a decision support system, the quote-related information including one or more of:
an indication of whether or not the vendor associated with the quoter object can fulfill the specified order;
an indication of a price for the specified order;
an indication of a shipment date for the specified order;
an indication of a production date for the specified order;
an indication of a production time for the specified order; and
an indication of a shipment weight for the specified order.

17. The retailing system of claim 11 wherein quoter object definitions are provided by vendors for incorporation into the retailing system.

18. The retailing system of claim 11 wherein the decision support system instantiated to manage an exchange of information between a customer and the retailing system returns a quote for an order to the customer based on quote-related information obtained from one or more of the plurality of quoter objects.

19. The retailing system of claim 18 wherein the decision support system instantiated to manage an exchange of information between a customer and the retailing system prompts a customer to place an order after returning a quote for the order to the customer.

20. The retailing system of claim 19 wherein the decision support system wherein, following prompting of a customer for an order and receiving a positive response from the customer, places the order with a vendor on behalf of the customer through a quoter object interface feature provided by the quoter object associated with a vendor.

21. A manufacturing system for manufacturing products specified by remote customers and manufactured remotely by subcontractors, the manufacturing system comprising:
a first electronic communications interface in an electronic computer through which remote customers exchange information with the manufacturing system;

one or more decision support systems within the manufacturing system, each decision support system instantiated within an electronic computer managing an exchange of information between a customer and the manufacturing system to assemble a product design and order for the customer;

a plurality of quoter objects wherein a quoter object instantiated within an electronic computer for each potential subcontractor that may fulfill an order assembled by a decision support system, the quoter object supplying quote-related information to the decision support system;

a second electronic communications interface through which the plurality of quoter objects exchange information with remote subcontractors; and an electronic database management system, the database management system storing information for retrieval by decision support systems and the plurality of quoter objects.

22. The manufacturing system of claim 21 wherein the first and second communications interfaces support exchange of information through one or more of:
an Internet-based communications protocol;
a website interface;
an XML document exchange interface; and
a facsimile document exchange interface.

23. The manufacturing system of claim 21 wherein the decision support system instantiated to manage an exchange of information between a customer and the manufacturing system prompts the customer for sufficient information to assemble a list of attributes and attribute values that together comprise an order.

24. The manufacturing system of claim 23 wherein the decision support system, having assembled an order specification, accesses the database management system to determine a list of subcontractors, each subcontractor in the list a potential subcontractor for the order.

25. The manufacturing system of claim 24 wherein the decision support system instantiates a quoter object for each subcontractor in the list of subcontractors and accesses the quoter object instantiated for the subcontractor to obtain quote-related information used to formulate a quote for fulfillment of the order by the subcontractor.

26. The manufacturing system of claim 21 wherein a quoter object provides an interface through which quote-related information for a specified order can be obtained by a decision support system, the quote-related information including one or more of:
an indication of whether or not the subcontractor associated with the quoter object can fulfill the specified order;
an indication of a price for the specified order;
an indication of a shipment date for the specified order;
an indication of a production date for the specified order;
an indication of a production time for the specified order; and an indication of a shipment weight for the specified order.

27. The manufacturing system of claim 21 wherein quoter object definitions are provided by subcontractors for incorporation into the manufacturing system.

28. The manufacturing system of claim 21 wherein the decision support system instantiated to manage an exchange of information between a customer and the manufacturing system returns a quote for an order to the customer based on quote-related information obtained from one or more of the plurality of quoter objects.

29. The manufacturing system of claim 21 wherein the decision support system instantiated to manage an exchange of information between a customer and the manufacturing system prompts a customer to place an order after returning a quote for the order to the customer.

30. The manufacturing system of claim 29 wherein the decision support system, following prompting of a customer for an order and receiving a positive response from the customer, places the order with a subcontractor on behalf of the customer through a quoter object interface feature provided by the quoter object associated with a subcontractor.

* * * * *